(12) United States Patent
Okamoto et al.

(10) Patent No.: US 10,686,529 B2
(45) Date of Patent: Jun. 16, 2020

(54) OPTICAL COMMUNICATION SYSTEM AND OPTICAL COMMUNICATION METHOD

(71) Applicants: National University Corporation Hokkaido University, Sapporo-shi, Hokkaido (JP); OPTOQUEST CO., LTD., Ageo, Saitama (JP); NATIONAL INSTITUTE OF INFORMATION AND COMMUNICATIONS TECHNOLOGY, Koganei-shi, Tokyo (JP)

(72) Inventors: Atsushi Okamoto, Sapporo (JP); Tomokazu Oda, Sapporo (JP); Taketoshi Takahata, Ageo (JP); Shusaku Noda, Ageo (JP); Naoya Wada, Koganei (JP)

(73) Assignees: National University Corporation Hokkaido University, Hokkaido (JP); Optoquest Co., Ltd., Saitama (JP); National Institute of Information and Communications Technology, Tokyo (JP)

( * ) Notice: Subject to any disclaimer, the term of this patent is extended or adjusted under 35 U.S.C. 154(b) by 88 days.

(21) Appl. No.: 15/779,693

(22) PCT Filed: Oct. 14, 2016

(86) PCT No.: PCT/JP2016/080598
§ 371 (c)(1),
(2) Date: May 29, 2018

(87) PCT Pub. No.: WO2017/094369
PCT Pub. Date: Jun. 8, 2017

(65) Prior Publication Data
US 2020/0014465 A1 Jan. 9, 2020

(30) Foreign Application Priority Data
Nov. 30, 2015 (JP) ................. 2015-233785

(51) Int. Cl.
*H04B 10/548* (2013.01)
*H04B 10/2581* (2013.01)
(Continued)

(52) U.S. Cl.
CPC ....... *H04B 10/548* (2013.01); *H04B 10/2581* (2013.01); *H04J 14/02* (2013.01); *H04J 14/04* (2013.01)

(58) Field of Classification Search
CPC ... H04B 10/548; H04B 10/2581; H04J 14/02; H04J 14/04
(Continued)

(56) References Cited

U.S. PATENT DOCUMENTS

2012/0230687 A1* 9/2012 Okamoto ................. G02B 5/32
398/44
2014/0064049 A1* 3/2014 Fujita .................... G11B 7/0917
369/47.49
(Continued)

FOREIGN PATENT DOCUMENTS

| EP | 2495611 A1 | 9/2012 |
| WO | 2011/052405 A1 | 5/2011 |
| WO | 2014/111912 A1 | 7/2014 |

OTHER PUBLICATIONS

Supplementary European Search Report dated Jun. 25, 2019 in corresponding European Patent Application No. 16870309.8.
(Continued)

*Primary Examiner* — Dalzid E Singh
(74) *Attorney, Agent, or Firm* — Mintz Levin Cohn Ferris Glovsky and Popeo, P.C.; David G. Conlin; Steven M. Jensen

(57) ABSTRACT

An optical communication system is arranged to bring out potential capabilities of mode-division multiplexing (MDM). The optical communication system includes a hologram medium in which holograms are multiplex-recorded so as to correspond to respective spatial modes of
(Continued)

signal light transmitted by a multi-mode fiber (MMF). A phase plate modulates phases of the respective spatial modes so as to reduce a spatial overlap between the spatial modes, and is provided on a side of the hologram medium on which signal light enters the hologram medium.

4 Claims, 16 Drawing Sheets

(51) Int. Cl.
    *H04J 14/02*     (2006.01)
    *H04J 14/04*     (2006.01)
(58) Field of Classification Search
    USPC .......................................................... 398/79
    See application file for complete search history.

(56) References Cited

U.S. PATENT DOCUMENTS

| | | | |
|---|---|---|---|
| 2014/0199066 A1 | 7/2014 | Martelli et al. | |
| 2015/0349910 A1* | 12/2015 | Huang | H04J 14/00 398/44 |
| 2016/0028479 A1* | 1/2016 | Ren | H04B 10/1121 398/43 |
| 2016/0043794 A1* | 2/2016 | Ashrafi | H04B 7/0697 370/329 |

OTHER PUBLICATIONS

Y. Wakayama et al., "Mode demultiplexer using angularly multiplexed volume holograms," Opt. Express 21(10), pp. 12920-12933 (2013).

N. Hanzawa et al., "Mode multi/demultiplexing with parallel waveguide for mode division multiplexed transmission," Opt. Express 22(24), pp. 29321-29330 (2014).

C. Koebele et al., "40km Transmission of Five Mode Division Multiplexed Data Streams at 100Gb/s with low MIMO-DSP Complexity," European Conference and Exposition on Optical Communications, Optical Society of America, pp. 1-3 (2011).

R. Essiambre et al., "Capacity Trends and Limits of Optical Communication Networks," Proceedings of the IEEE 100 (5), pp. 1035-1055 (2012).

S. Berdague et al., "Mode division multiplexing in optical fibers," Appl. Opt. 21(11), pp. 1950-1955 (1982).

Y. Shuto et al., "Fiber fuse phenomenon in step-index single-mode optical fibers," IEEE J. Quantum Electron. 40(8), pp. 1113-1121 (2004).

A. Chraplyvy, "Limitations on Lightwave Communications Imposed by Optical Fiber Nonlinearities," J. Lightwave Tech. 8(10), pp. 1548-1557 (1990).

B. Zhu et al., "Space-, Wavelength-, Polarization-Division Multiplexed Transmission of 56-Tb/s over a 76.8-km Seven-core Fiber," Optical Fiber Communication Conference, Optical Society of America (2011).

C. Brackett, "Dense wavelength division multiplexing networks: principles and applications," IEEE Journal on Selected Areas in Communications 8(6), pp. 1950-1955 (1990).

International Preliminary Report on Patentability issued in corresponding International Application No. PCT/JP2016/080598, dated Jun. 5, 2018.

International Search Report issued in corresponding International Application No. PCT/JP2016/080598, dated Nov. 29, 2016.

* cited by examiner

| | PHASE MODULATION AMOUNT DISTRIBUTION OF PHASE PLATE | INTENSITY DISTRIBUTION | |
|---|---|---|---|
| | | BEFORE PHASE MODULATION | AFTER PHASE MODULATION |
| $LP_{01}$ | |  |  |
| $LP_{11a}$ |  |  |  |
| $LP_{11b}$ | |  |  |

OPTICAL COMMUNICATION SYSTEM AND OPTICAL COMMUNICATION METHOD

TECHNICAL FIELD

The present invention relates to an optical communication system and an optical communication method in each of which an optical fiber (a multi-mode fiber etc.) capable of transmitting signal light containing a plurality of spatial modes is used as a transmission optical waveguide.

BACKGROUND ART

Recent years have witnessed a sharp increase in information traffic due to widespread use of the Internet. The increase in information traffic is expected to continue as mobile data communications, M2M (Machine to Machine) communications, and the like come into further increasing use. Accordingly, there is an urgent need to further increase capacities of optical fiber communication networks which support those communications. So far, attempts have been made to increase communication capacities through a combination of (i) wavelength-division multiplexing (WDM) which makes simultaneous use of a plurality of different wavelengths (see Non-patent Literature 1), (ii) polarization-division multiplexing (PDM) which utilizes differences in polarization (see Non-patent Literature 2), and (iii) the like.

However, a single-mode fiber (SMF) which supports current optical fiber communication networks suffers nonlinear effects in which a signal pulse deforms (see Non-patent Literature 3) and thermal destruction of the optical fiber (see Non-patent Literature 4), each caused by an increased input power density associated with an increased multiplexing order. As such, limitations of the attempts to increase transmission capacities have been pointed out (see Non-patent Literature 5).

In view of this, great attentions are currently drawn to a next-generation optical communication technology for further increasing the capacities of optical fiber communications. An example of promising next-generation optical communication technology is mode-division multiplexing (MDM) which uses a multi-mode fiber (MMF) (see Non-patent Literature 6). In the MDM, the MMF having a core diameter greater than that of the SMF is used, and light beams of a respective plurality of spatial modes propagating through the MMF are independently subjected to signal modulation. This allows optical transmission capacity to be increased in proportion to the number of spatial modes used. Accordingly, an increase in transmission capacity is expected to be achieved.

Further, as described above, the MMF used in the MDM has a core diameter greater than that of the SMF. This allows preventing an increase in input power density. Accordingly, the MDM is less likely to be affected by nonlinear effects and thermal destruction.

Further, the MDM can be combined with an existing multiplexing technology such as WDM, so that an ultimate optical transmission capacity achieved is a multiplication of a current communication capacity and the number of spatial modes used. Thus, a significant improvement in optical transmission capacity is achieved.

For the reasons above, the MDM is a technology that is attracting great attentions. Meanwhile, in actual use of the MDM, it is essential that a transmitting end and a receiving end have a spatial mode multiplexing technology and a spatial mode demultiplexing technology, since the plurality of spatial modes in the MMF are treated as independent channels.

As conventional spatial mode multiplexing/demultiplexing technologies, a technique that uses a phase plate (see Non-patent Literature 7) and a technique that uses a planar lightwave circuit (see Non-patent Literature 8) have been proposed. The technique using the phase plate is characterized in that demultiplexing can be performed even in a case in which spatial modes spatially overlap with each other. The technique using the planar lightwave circuit is characterized in that loss in multiplexing and demultiplexing is small and a reduction in device size is possible. However, according to the technique using the phase plate, it is necessary to provide a certain number of phase plates which number depends on the number of modes used, and it is also necessary to use a beam splitter in order to perform multiplexing or demultiplexing of signal light. This undesirably adds to size and complexity of a system. Further, the technique using the planar lightwave circuit has a problem that the number of modes used is limited, since it is extremely difficult to handle high-order spatial modes under the current technology.

As a technology that can solve the above problems, there has been proposed an all-optical mode multi/demultiplexer which involves a dynamic multiplex hologram realized with use of a hologram medium (see Patent Literature 1 and Non-patent Literature 9). According to the technology, (i) interference fringes between spatial modes and reference light which propagates at a different angle are recorded in the hologram medium in advance, (ii) multiplex-recording of a record thus obtained is carried out while changing an angle between the spatial modes and the reference light so as to obtain a volume hologram, and (iii) the plurality of spatial modes are demultiplexed from the volume hologram in an all-optical manner. This allows a plurality of spatial modes to be handled simultaneously with use of a single device. Further, since the demultiplexing is carried out via recording of the spatial modes in the hologram medium, the demultiplexing can be carried out even in a case where high-order spatial modes are involved.

CITATION LIST

Patent Literature

[Patent Literature 1]
International Patent Application Publication No. WO20011/052405 (Publication date: May 5, 2011)

Non-Patent Literature

[Non-Patent Literature 1]
C. A. Brackett, "Dense wavelength division multiplexing networks: principles and applications," IEEE JSAC 8 (6), 948-964 (1990).
[Non-Patent Literature 2]
B. Zhu, T. Taunay, M. Fishteyn, X. Liu, S. Chandrasekhar, M. Yan, J. Fini, E. Monberg, and F. Dimarcello, "Space-, Wavelength-, Polarization-Division Multiplexed Transmission of 56-Tb/s over a 76.8-km Seven-Core Fiber," OFC/NFOEC PDPB7 (2011).
[Non-Patent Literature 3]
A. R. Chraplyvy, "Limitations on Lightwave Communications Imposed by Optical Fiber Nonlinearities," J. Lightwave Tech. 8 (10), 1548-1552 (1990).

[Non-Patent Literature 4]

Y. Shuto, S. Yanagi, S. Asakawa, M. Kobayashi, and R. Nagase, "Fiber fuse phenomenon in step-index single-mode optical fibers," IEEE J. Quantum Electron. 40 (8), 1113-1121 (2004).

[Non-Patent Literature 5]

R.-J. Essiambre, and Robert W. Tkach., "Capacity Trends and Limits of Optical Communication Networks,"Proc. IEEE, 100 (5), 1035-1055 (2012).

[Non-Patent Literature 6]

S. Berdague, and P. Facq, "Mode division multiplexing in optical fibers," Appl. Opt. 21 (11), 1950-1955 (1982).

[Non-Patent Literature 7]

C. Koebele, M. Salsi, L. Milord, R. Ryf, C. Bolle, P. Sillard, S. Bigo, and G. Charlet, "40 km Transmission of Five Mode Division Multiplexed Data Streams at 100 Gb/s with low MIMO-DSP Complexity," ECOC Th.13.C.3 1-3 (2011).

[Non-Patent Literature 8]

N. Hanzawa, K. Saitoh, T. Sakamoto, T. Matsui, K. Tsujikawa, M. Koshiba, and F Yamamoto, "Mode multi/demultiplexing with parallel waveguidefor mode division multiplexed transmission," Opt. Express 22 (24), 29321-29330 (2014).

[Non-Patent Literature 9]

Y. Wakayama, A. Okamoto, K. Kawabata, A. Tomita, and K. Sato, "Mode demultiplexer using angularly multiplexed volume holograms," Opt. Express 21 (10), 12920-12933 (2013).

SUMMARY OF INVENTION

Technical Problem

However, the technologies disclosed in Patent Literature 1 and Non-patent Literature 9 (hereinafter, conventional technologies) also face a problem that, due to the use of a multiplex-recorded hologram, in a case where spatial modes entering a hologram medium as signal light beams have a significant overlap therebetween, a demultiplexing characteristic for demultiplexing spatial modes is significantly deteriorated. Particularly, since compensation of a crosstalk in the MDM is carried out by signal processing, a commonly practiced communication method of using a combination of spatial modes whose orders are close to each other can be problematic. That is, in a case of demultiplexing spatial modes that are typically used in the MDM, for example, $LP_{01}$, $LP_{11}$, and $LP_{21}$ whose orders are low and close to each other, an SNR obtained is small. Thus, the technologies disclosed in Patent Literature 1 and Non-patent Literature 9 have a problem that potential capabilities of the MDM cannot be brought out.

The present invention is accomplished in view of the foregoing problem. An object of the present invention is to provide an optical communication system which (i) enables an improvement in demultiplexing characteristic for demultiplexing spatial modes whose orders are low and close to each other and (ii), accordingly, allows bringing out potential capabilities of a mode-division multiplexing communication (MDM) in which a multi-mode fiber (MMF) is used.

Solution to Problem

In order to attain the object, an optical communication system of the present invention is an optical communication system performing a communication with use of an optical fiber capable of transmitting signal light containing a plurality of spatial modes, the optical communication system including: a multiplex hologram recording section in which holograms are multiplex-recorded so as to correspond to the respective plurality of spatial modes of the signal light transmitted by the optical fiber; and a phase plate provided on a side of the multiplex hologram recording section on which side the signal light enters the multiplex hologram recording section, the phase plate modulating phases of the respective plurality of spatial modes of the signal light so as to reduce a spatial overlap between the plurality of spatial modes.

Further, an optical communication method of the present invention is an optical communication method performing a communication with use of an optical fiber capable of transmitting signal light containing a plurality of spatial modes, the method including: a recording step of (i) modulating, with use of a phase plate, phases of the respective plurality of spatial modes of the signal light transmitted by the optical fiber and (ii) multiplex-recording the phases, which have been modulated, in a multiplex hologram recording section, the phase plate modulating the phases of the respective plurality of spatial modes so as to reduce a spatial overlap between the plurality of spatial modes.

According to the configurations above, the phase plate which modulates the phases of the respective plurality of spatial modes of the signal light so as to reduce a spatial overlap between the plurality of spatial modes is provided on the side of the multiplex hologram recording section on which side the signal light enters the multiplex hologram recording section. This allows the plurality of spatial modes of the signal light to have respective intensity distributions having a small spatial overlap therebetween. This enables an improvement in demultiplexing characteristic for demultiplexing the plurality of spatial modes in the multiplex hologram recording section.

Accordingly, even in a case of a combination of spatial modes whose orders are close to each other, the spatial modes have respective intensity distributions having a small spatial overlap therebetween. This enables an improvement in demultiplexing characteristic of the spatial modes in the multiplex hologram recording section. As such, the present invention is suitable for a mode-division multiplexing communication (MDM) in which compensation of a crosstalk is carried out by signal processing and, accordingly, a combination of modes whose orders are close to each other is typically used.

Accordingly, it becomes possible to bring out potential capabilities of the mode-division multiplexing communication (MDM) in which a multi-mode fiber (MMF) is used.

In order to modulate the phases of the plurality of spatial modes so as to reduce a spatial overlap between the plurality of spatial modes, the following configurations can be employed.

It is possible to employ a configuration in which a phase modulation amount distribution of the phase plate is set such that in the signal light which passes through the phase plate, a spatial overlap between the plurality of spatial modes after the signal light passes through the phase plate is smaller than that before the signal light passes through the phase plate.

Further, it is possible to employ a configuration in which a/the phase modulation amount distribution of the phase plate is set in accordance with the plurality of spatial modes of the signal light which passes through the phase plate.

The configurations above allow using a phase plate which reliably allows reducing an overlap between the intensity distributions of the respective plurality of spatial modes in the signal light. This makes the present invention even more suitable for the mode-division multiplexing communication (MDM).

It is preferable that the multiplex hologram recording section be a photorefractive medium.

According to the configuration above, use of the photorefractive medium as the multiplex hologram recording section enables easy formation of a dynamic hologram (rewritable hologram) in the multiplex hologram recording section. Accordingly, even in a case where the spatial modes transmitted through the optical fiber undergo temporal fluctuations and distortions because of an external environment (bending of the fiber, a change in temperature, or the like), it is possible to maintain and continue the communication by dynamically rewriting the hologram.

Advantageous Effects of Invention

The present invention enables, in a mode-division multiplexing communication (MDM) in which a multi-mode fiber (MMF) is used, an improvement in demultiplexing characteristic for demultiplexing spatial modes whose orders are low and close to each other. Accordingly, the present invention allows bringing out potential capabilities of the mode-division multiplexing communication (MDM).

DESCRIPTION OF EMBODIMENTS

Embodiment 1

The following description will discuss Embodiment 1 of the present invention in detail.

(General Description of Optical Communication System: Without Phase Plate)

Before discussing an optical communication system of the present invention, an optical communication system that is a premise for the present invention will be described with reference to FIGS. 3 and 4. The following describes, as the optical communication system, an all-optical mode multi/demultiplexer which involves a dynamic multiplex hologram and uses a hologram medium as a multiplex hologram recording section.

Figure 3:
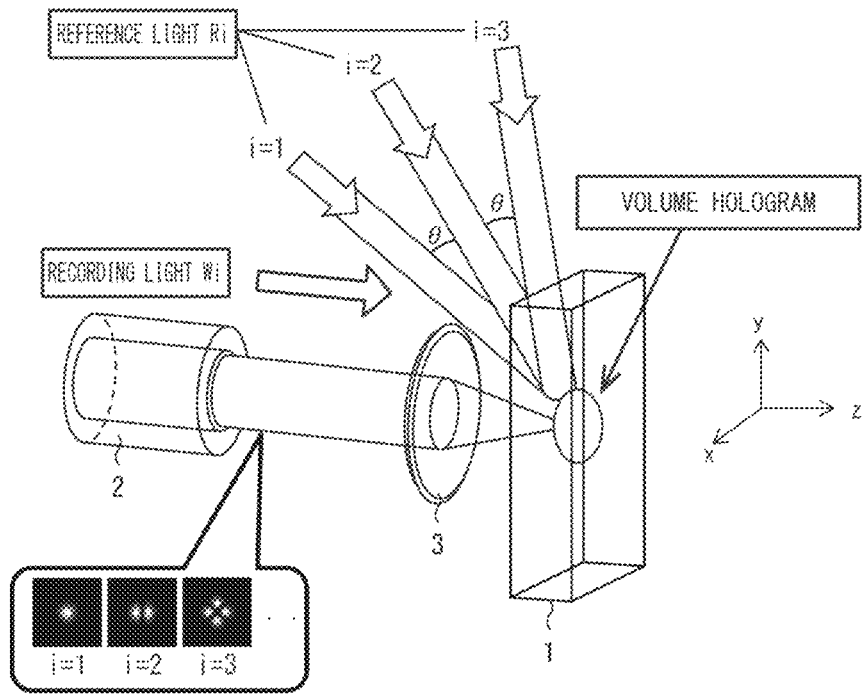
FIG. 3 is a view illustrating a schematic configuration of an optical communication system for comparison, the view illustrating an operation of a process of hologram recording in the optical communication system.
Figure 4:
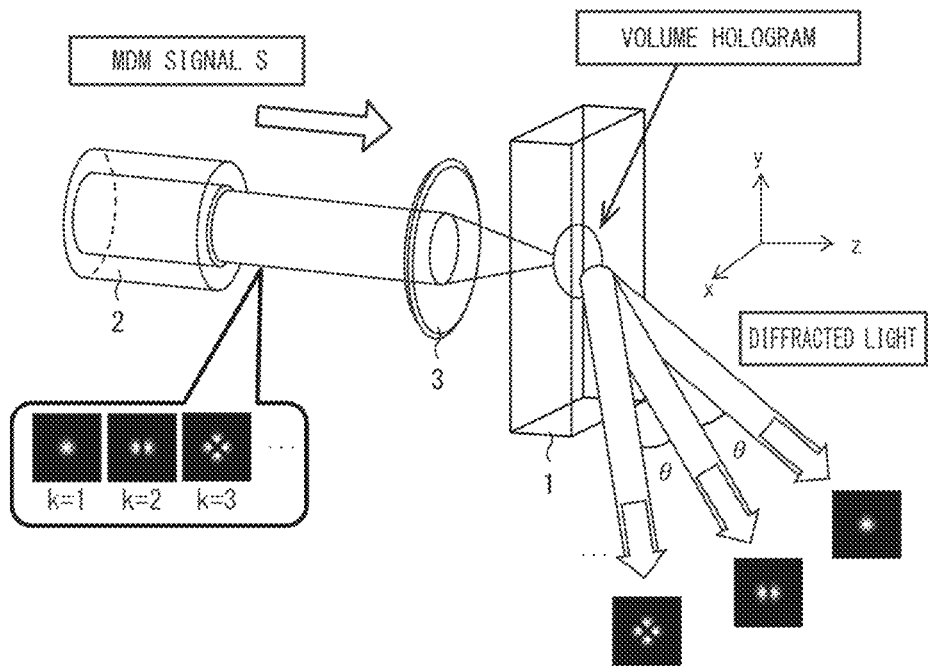
FIG. 4 is a view illustrating an operation of a process of hologram reproduction in the optical communication system illustrated in FIG. 3.

FIG. 3 illustrates a process of hologram recording, and FIG. 4 illustrates a process of hologram reproduction.

The optical communication system that is the premise includes (i) a hologram medium 1 which serves as a multiplex hologram recording section, (ii) an MMF (multi-mode fiber) 2 which transmits light containing a plurality of spatial modes, and (iii) a light collecting lens 3 which is provided on a path from the MMF 2 to the hologram medium 1 and collects the light emitted from the MMF 2.

That is, the optical communication system serves as (i) a multiplexer in which a hologram is recorded in the hologram medium 1 for each of the spatial modes and (ii) a demultiplexer which demultiplexes and reproduces, for each of the spatial modes (i=1, i=2, i=3), a multiplex hologram which has been recorded in the hologram medium 1. Note that "i" represents a mode number for distinguishing between the spatial modes.

In the process of hologram recording (a function as the multiplexer of the optical communication system), as shown in FIG. 3, recording light Wi (i=1, i=2, i=3), which has a complex amplitude of a plurality of LP modes (spatial modes) excited in the MMF 2 and has been collected by the light collecting lens 3, and reference light Ri (i=1, i=2, i=3), which propagates at a different angle, enter the hologram medium 1 simultaneously. At this time, due to interference between the recording light Wi and the reference light Ri, interference fringes are recorded in the hologram medium 1. This recording is carried out a plurality of times (in Embodiment 1, three times) while changing an angle between the LP modes of the recording light Wi and the reference light Ri. Thus, holograms, the number of which is equal to the number of the LP modes to be demultiplexed, are angle-multiplex-recorded in the hologram medium 1. An incident angle $\theta_{Ri}$ of the reference light Ri (i=1, i=2, i=3) is set so as to differ for each of the LP modes (i=1, i=2, i=3). Accordingly, in an m-th hologram recording, recording light Wm and reference light Rm can be represented by the following formulae (1) and (2):

[Math 1]

$$W_m = A_m(x,y,z)\exp(i\phi_m(x,y,z)) \quad (1)$$

[Math 2]

$$R_m = A_R \exp[ik(x \sin\theta_{Rm} + z \cos\theta_{Rm})] \quad (2)$$

wherein $A_m$ (x, y, z) and $A_R$ are each an amplitude, $\theta_{Rm}$ is an incident angle, and $\phi_m$ (x, y, z) is a phase that determines a mode of the fiber. An amplitude transmittance T which directly contributes to demultiplexing of signal light can be represented by the following formula (3).

[Math 3]

$$T = A_R \sum_{m=1}^{M} A_m^*(x, y, z) \exp[-i\phi_m(x, y, z) + ik(z \sin\theta_{Rm} + z \cos\theta_{Rm})] \quad (3)$$

In the process of hologram reproduction (functioning as the demultiplexer of the optical communication system), as shown in FIG. 4, an MDM signal S, which has a complex amplitude of the LP modes (i=1, i=2, i=3) excited in the MMF 2 and whose light has been collected by the light collecting lens 3, enters a volume hologram in the hologram medium 1. The entering of the MDM signal S into the volume hologram causes the hologram, which have been recorded as the volume hologram, to be demultiplexed and reproduced.

The MDM signal S can be represented by the following formula (4) by giving different time-series signals $a_n$ (t) to respective mode distributions $G_m$.

[Math 4]

$$S = \sum_{n=1}^{N} a_n(t) A_n(x, y, z) \exp[j\phi_n(x, y, z)] \quad (4)$$

The MDM signal S is diffracted, in accordance with an incident angle of the reference light, by entering the volume hologram which has been recorded as described above. Diffracted light $D_l$ thus obtained can be represented by the following formula (5):

[Math 5]

$$\begin{aligned} D_1 &= \eta \int_{x=-\frac{d}{2}}^{x=\frac{d}{2}} \int_{y=-\frac{d}{2}}^{y=\frac{d}{2}} \int_{z=-\frac{L}{2}}^{z=\frac{L}{2}} TS \exp[-ik(x\sin\theta_{Dl} + \\ & z\cos\theta_{Dl})] dz\, dy\, dx \\ &= \eta A_R \int_{x=-\frac{d}{2}}^{x=\frac{d}{2}} \int_{y=-\frac{d}{2}}^{y=\frac{d}{2}} \int_{z=-\frac{L}{2}}^{z=\frac{L}{2}} \sum_{m=1}^{M} \sum_{n=1}^{N} a_n(t) A_m^* A_n \exp \\ & [i(\phi_n - \phi_m) + ikx(\sin\theta_{Rm} - \sin\theta_{Dl})] + ikz(\cos\theta_{Rm} - \\ & \cos\theta_{Dl}) dz\, dy\, dx \end{aligned} \quad (5)$$

wherein d is a width of the hologram, L is a thickness of the hologram, $\eta$ is diffraction efficiency, and $\theta_{D1}$ is a diffraction angle. From the formula (5), it is understood that when m=n and $\phi_m = \phi_n$, incident light is significantly diffracted in a direction of $\theta_{D1} = \theta_{Rm}$. In this case, a diffracted light wave $D_1$ can be represented by the following formula (6).

[Math 6]

$$D_l = \eta A_R \sum_{m=0}^{M} a_m(t) \int_{x=-\frac{d}{2}}^{x=\frac{d}{2}} \int_{y=-\frac{d}{2}}^{y=\frac{d}{2}} \int_{z=-\frac{L}{2}}^{z=\frac{L}{2}} |A_m|^2 dz\, dy\, dx \quad (6)$$

Based on the above principle, the present demultiplexer is capable of demultiplexing an MDM signal to components at respective angles that spatially differ for each LP mode. Further, even an MDM signal into which a plurality of LP modes have been multiplexed can be demultiplexed all at once by the demultiplexer.

With the above-described mode demultiplexer involving a volume hologram, demultiplexing of three LP modes (e.g., $LP_{01}$, $LP_{51}$, and $LP_{10,1}$) whose orders significantly differ from each other yields a high SNR (signal/noise), whereas demultiplexing of LP modes (e.g., $LP_{01}$, $LP_{11}$, and $LP_{21}$) whose orders are close to each other yields a small SNR. A factor for the decrease in SNR in the case of the combination of modes whose orders are close to each other is a spatial overlap between intensity distributions of the respective LP modes. It is a characteristic of LP modes in the MMF that an LP mode of a higher-order is located closer to an outer side of the core. In a combination of LP modes (e.g., $LP_{01}$, $LP_{51}$, and $LP_{10,1}$) which actually yields a high SNR, a low-order LP mode has an intensity at a center of the core, and a high-order LP mode has an intensity on an outer side of the core. Accordingly, the LP modes have a small spatial overlap therebetween. Meanwhile, in a case of a combination of LP modes (e.g., $LP_{01}$, $LP_{11}$, $LP_{21}$) which yields a small SNR, an intensity of a low-order LP mode and an intensity of a high-order LP mode are both present near the center of the core, so that the LP modes have a large spatial overlap therebetween.

With the mode demultiplexer, even in a case where a spatial overlap between spatial modes occurs, demultiplexing can be carried out by increasing an angle of each reference light so as to increase a phase difference in interference fringes corresponding to each of the spatial modes. On the other hand, increasing the angle of the reference light undesirably decreases diffraction efficiency. It is therefore preferable that the reference light have a small angular difference. In a case where an angle of the reference light is reduced, the phase difference in each set of interference fringes recorded in the hologram medium is reduced. This results in a problem that a spatial overlap between the spatial modes is increased so as to cause deterioration in demultiplexing characteristic for demultiplexing the spatial modes.

In view of the above, there has been proposed a phase code multiplexing method in which, in a case where a plurality of signal light beams (in this case, spatial modes) spatially overlap with each other when multiplex-recording is made in a generally used hologram medium, reference light is subjected to phase modulation differently for each of the respective signal light beams so as to prevent a signal light beam other than a desired signal light beam from appearing as an unnecessary diffracted light beam. However, considering that it is characteristic of the present technique that reference light itself is diffracted and serves as signal light after demultiplexing, it is impossible to use the phase code multiplexing method.

Meanwhile, as described above, since compensation of a crosstalk is carried out by signal processing in the MDM, a communication in the MDM is typically made with use of a combination of spatial modes whose orders are close to each other. As such, in order to demultiplex spatial modes, it is important to attain a high SNR with use of a combination of low-order spatial modes. Accordingly, in terms of actual application, it is difficult to cover all spatial modes (in particular, spatial modes whose orders are low and close to each other) with use of the above-described mode demultiplexer involving a volume hologram, and it is impossible to bring out potential capabilities of the MDM with use of the mode demultiplexer.

In view of the above, the present invention pays attention to two combinations of spatial modes, namely, a combination of $LP_{01}$, $LP_{11}$, and $LP_{21}$ (hereinafter referred to as a group A) and a combination of $LP_{01}$, $LP_{11a}$, and $LP_{11b}$ (hereinafter referred to as a group B), each as spatial modes whose orders are close to each other and which are generally used in the MDM. In order to improve a demultiplexing characteristic for demultiplexing these spatial modes, the present invention proposes an optical communication system as described below.

According to the present invention, a phase plate is disposed on a side of the hologram medium on which side light enters the hologram medium. Thus, (i) when hologram recording is performed, recording light passing through the phase plate is subjected to phase modulation, and then enters the hologram medium and (ii) when hologram reproduction is performed, an MDM signal passing through the phase plate is subjected to phase modulation and then enters the hologram medium. Note here that a phase modulation amount distribution of the phase plate is set such that in signal light which passes through the phase plate, a spatial overlap between spatial modes after the signal light passes through the phase plate is smaller than that before the signal light passes through the phase plate.

Specifically, signal light (recording light or an MDM signal) enters a phase plate having a spatial phase modulation amount distribution that is designed in accordance with each combination of spatial modes in the group A or the group B so as to reduce a spatial overlap between the spatial modes. Note here that the phase plate used has a spatial phase modulation amount distribution which depends on the combination of the spatial modes. Then, in a similar manner to the general mode multi/demultiplexer involving a dynamic multiplex hologram, recording and demultiplexing in the hologram medium are carried out. In each of the recording and the demultiplexing, the spatial modes passing through the phase plate are converted, via a profile of the phase plate, so as to have respective intensity distributions having a small spatial overlap therebetween. This conversion allows improving a demultiplexing characteristic for demultiplexing spatial modes whose orders are closer to each other. Thus, the present invention allows improving a demultiplexing characteristic for demultiplexing spatial modes by approximately 5 DB to 10 dB in terms of decibel.

The following description will discuss an example of the optical communication system (optical communication method) of the present invention.

(Characteristic Portion of Optical Communication System)

Figure 1:
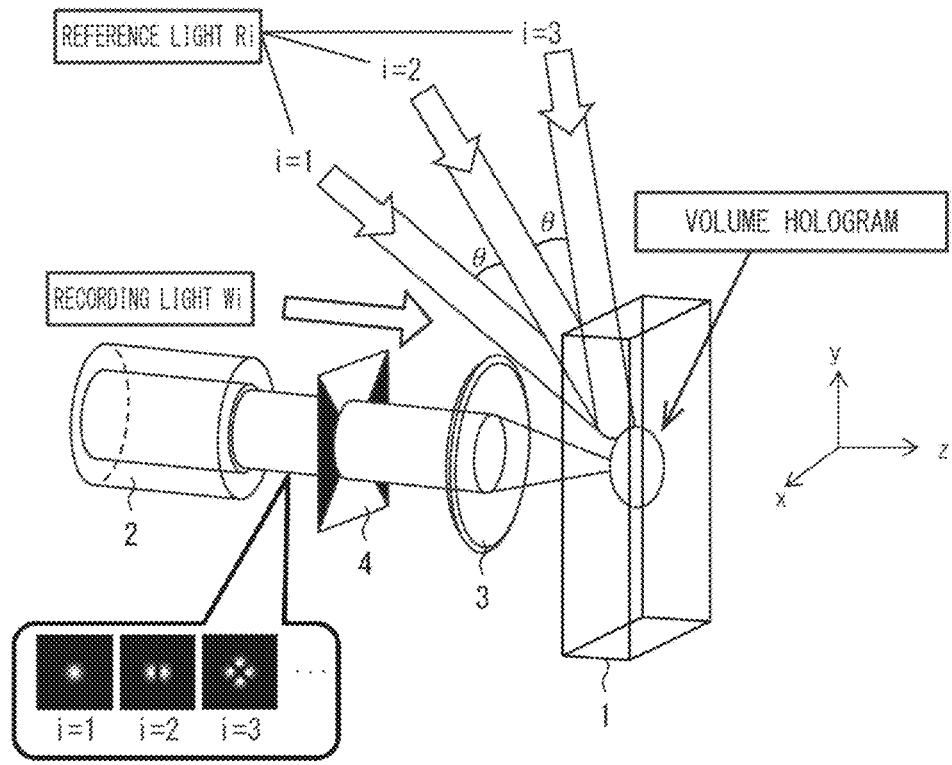
FIG. 1 is a view illustrating a schematic configuration of an optical communication system in accordance with Embodiment 1 of the present invention, the view illustrating a process of hologram recording in the optical communication system.
Figure 2:
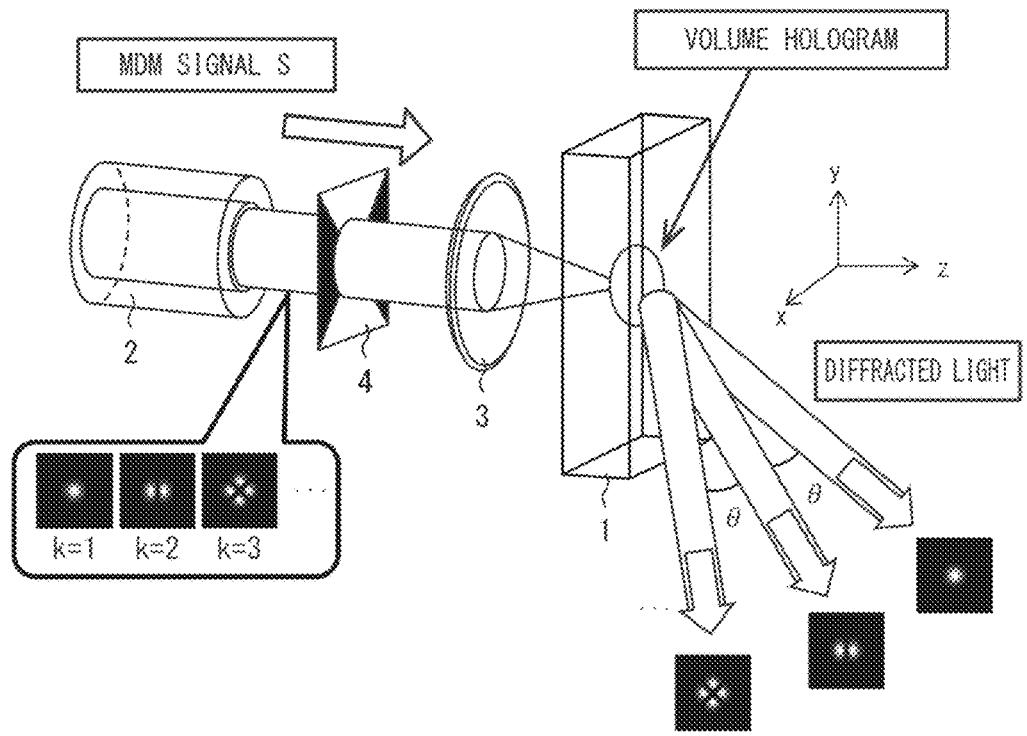
FIG. 2 is a view illustrating an operation of a process of hologram reproduction in the optical communication system illustrated in FIG. 1.

FIGS. 1 and 2 each illustrate a conceptual diagram of the optical communication system of the present invention. The optical communication system illustrated in FIGS. 1 and 2 differs from the above-described optical communication system that is the premise and illustrated in FIGS. 3 and 4 in that a phase plate 4 is provided on a side of a hologram medium 1 on which side light enters the hologram medium 1, that is, on a path between the hologram medium 1 and an MMF 2. Accordingly, in the optical communication system of the present invention, recording light in a process of hologram recording and an MDM signal in a process of hologram reproduction are each subjected to phase modulation by the phase plate and then each enter the hologram medium 1.

With reference to FIGS. 1 and 2, the following description will discuss a process of hologram recording and a process of hologram reproduction separately, as basic operations of the present invention. Note that detailed operation principles of hologram recording and hologram reproduction are similar to those of the optical communication system illustrated in FIGS. 3 and 4, and will not be repeatedly described in detail.

(Hologram Recording Process: Hologram Recording Step)

FIG. 1 is a view illustrating a process of hologram recording in the optical communication system of the present invention.

Figure 5:
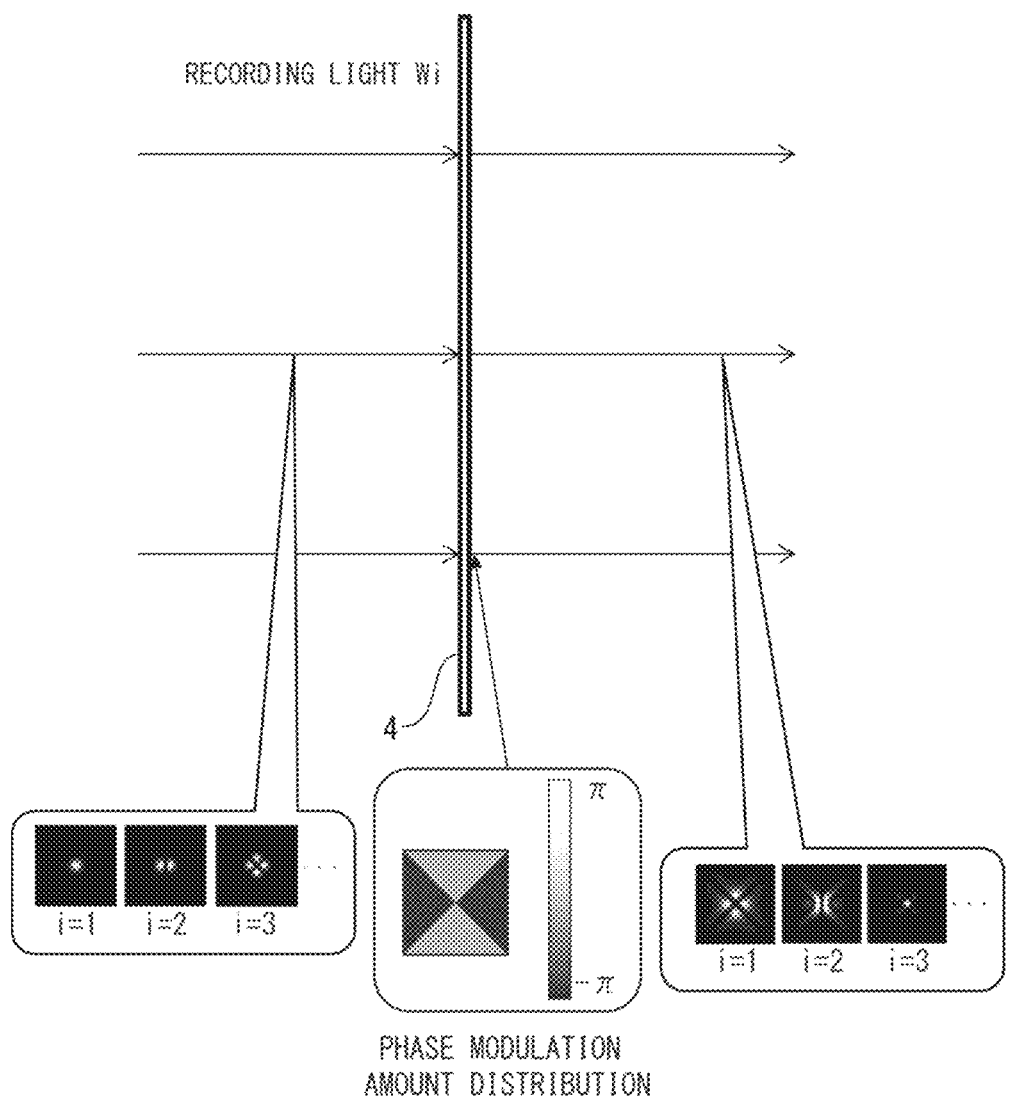
FIG. 5 is a view illustrating intensity distributions of signal light before and after phase modulation in the optical communication system illustrated in FIG. 1.

As illustrated in FIG. 1, first, recording light Wi, which is signal light emitted from the MMF 2, is subjected to spatial phase modulation via an effect of the phase plate 4 provided on a path of the recording light Wi. The phase plate 4 has a spatial phase modulation amount distribution which is determined in accordance with a combination of spatial modes. FIG. 5 shows details of the phase modulation carried out by the phase plate 4. As shown in FIG. 5, the phase modulation by the phase plate 4 causes the spatial modes of the recording light Wi so as to have respective intensity distributions having a small spatial overlap therebetween.

Subsequently, the recording light Wi thus converted and reference light Ri which propagates at a different angle interfere with each other, so that sets of interference fringes, the number of which sets is equal to the number of the spatial modes, are recorded in the hologram medium 1. At this time, an incident angle θ of the reference light Ri is changed for each of the spatial modes, so that angle multiplex-recording is made. Thus, a volume hologram corresponding to the recording light Wi is recorded in the hologram medium 1.

(Process of Hologram Reproduction)

FIG. 2 is a view illustrating a process of hologram reproduction in the optical communication system of the present invention.

As shown in FIG. 2, first, an MDM signal S (a combination of spatial modes identical to that in the hologram recording process) emitted from the MMF 2 is converted in a similar manner to the above-described hologram recording process, via the effect of the phase plate 4 provided on a path of the MDM signal S. This causes the spatial modes to be converted so as to have respective intensity distributions having a small spatial overlap therebetween, in a similar manner to the process of hologram recording.

Then, the MDM signal S which has been converted enters the volume hologram which has been recorded in the hologram medium 1. This yields diffracted light which is diffracted at an angle θ identical to that of the reference light Ri used in the hologram recording. That is, through the diffraction above, the spatial modes are obtained as diffracted light beams which have been demultiplexed at respective different angles.

Implementation Example

The following description will discuss an aspect of the present invention in actual application.

Figure 6:
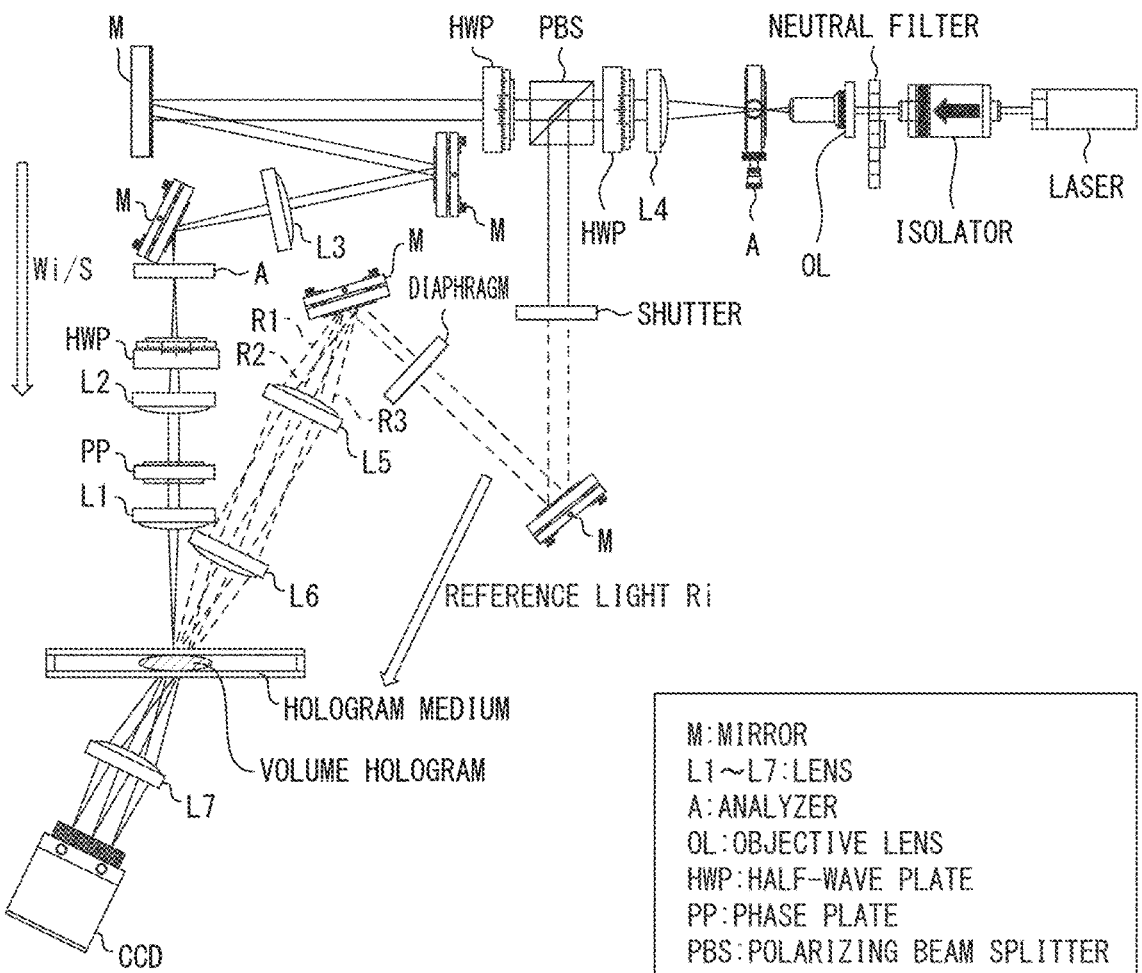
FIG. 6 is a view illustrating an optical system which is used for performing an operation test of an optical communication system of the present invention.

FIG. 6 illustrates an optical system which is used for performing an operation test of the optical communication system. As with FIGS. 1 and 2, the optical system illustrated in FIG. 6 is also configured such that a phase plate PP is provided on a path of signal light (recording light Wi, an MDM signal S).

First, light emitted from a laser passes through an isolator, a neutral filter, an objective lens OL, an analyzer A, and a lens L4 so as to enter a polarizing beam splitter PBS. The light is split by the polarizing beam splitter PBS into rectilinear light and reflected light.

Then, in a process of hologram recording, the rectilinear light is modulated by a spatial light modulator into the recording light Wi having a distribution of spatial modes. The recording light Wi is modulated by the phase plate PP so as to have intensity distributions having a small spatial overlap therebetween, and then enters a hologram medium. Meanwhile, the reflected light enters the hologram medium as reference light Ri, at an angle different from that of the recording light Wi. At this time, interference fringes between the recording light Wi and the reference light Ri are recorded in the hologram medium. This recording is carried out the same number of times as the number of spatial modes, while the spatial modes and an incident angle of the reference light Ri are changed. This causes a volume hologram to be recorded in the hologram medium.

Subsequently, in a process of hologram reproduction (a process of mode demultiplexing), only the signal light (the MDM signal S) enters the hologram medium. The signal light is modulated by the spatial light modulator so as to have a distribution of spatial modes. Then, the signal light thus modulated is modulated and similarly converted with use of the phase plate PP used in the process of recording. The signal light thus converted enters the hologram medium in which the interference fringes (the volume hologram) have been recorded. Thus, the signal light obtains diffracted light which is diffracted at an angle at which the reference light Ri entered the hologram medium in the process of hologram recording. In this case, since a diffraction angle differs for each of the spatial modes, demultiplexing of the spatial modes can be achieved.

(Effect)

In the optical system of the present invention, a spatial distribution of signal light (a plurality of spatial modes whose orders are low and close to each other) is converted by a phase plate which is provided additionally as described above. The phase plate is selected in accordance with a combination of the spatial modes. Accordingly, the spatial modes have respective intensity distributions having a small spatial overlap therebetween. This enables an improvement in mode demultiplexing characteristic for demultiplexing the spatial modes in the hologram medium. Consequently, the mode demultiplexing characteristic can be improved by 5 dB to 10 dB in terms of decibel. An effect of the present technique is exhibited only in a case of demultiplexing a combination of spatial modes having a significant overlap therebetween. Accordingly, the present technique is suitable for demultiplexing of a combination of spatial modes whose orders are close to each other.

The present invention is suitable for the MDM, in which compensation of a crosstalk is carried out by signal processing and, accordingly, modes whose orders are close to each other are typically used. Thus, the present invention is extremely effective when used in the MDM, and makes a great contribution to improving technology in next-generation optical communications.

Note that the descriptions above have dealt with an example in which a photorefractive medium is used as the hologram medium 1 illustrated in FIGS. 1 through 4. That is, in the descriptions above, rewriting of a hologram is realized by use of the photorefractive medium as the hologram medium 1. Note, however, that in a case where rewriting of a hologram is not performed, a general hologram medium without a photorefractive property, such as a photopolymer, can also enable operations. However, many media other than the photorefractive medium do not allow a hologram to be rewritten after formation of the hologram. As such, the media other than the photorefractive medium has a disadvantage that, unlike the photorefractive medium, the media do not allow signal demultiplexing to be maintained and continued by rewriting a hologram in a case where temporal fluctuations and distortions occur in modes transmitted through an optical fiber. Thus, it is more advantageous to use the photorefractive medium.

Example 1

The following description will discuss, with reference to FIGS. 7 through 12, Example 1 of the present invention.

In Example 1, numerical analysis is conducted to confirm an effect of the present invention and show results of the numerical analysis.

That is, the numerical analysis first confirms that a phase plate designed to improve a demultiplexing characteristic for demultiplexing the group A (spatial modes $LP_{01}$, $LP_{11}$, and $LP_{21}$) or a phase plate designed to improve a demultiplexing characteristic for demultiplexing the group B (spatial modes $LP_{01}$, $LP_{11a}$, and $LP_{11b}$) causes the spatial modes to be converted so as to have intensity distributions having a small overlap therebetween. Further, with use of the group A or the group B thus converted, hologram recording and mode demultiplexing are actually carried so as to confirm that an improvement in demultiplexing characteristic is achieved. In the numerical analysis, a photopolymer is used as a hologram medium.

Figure 7:
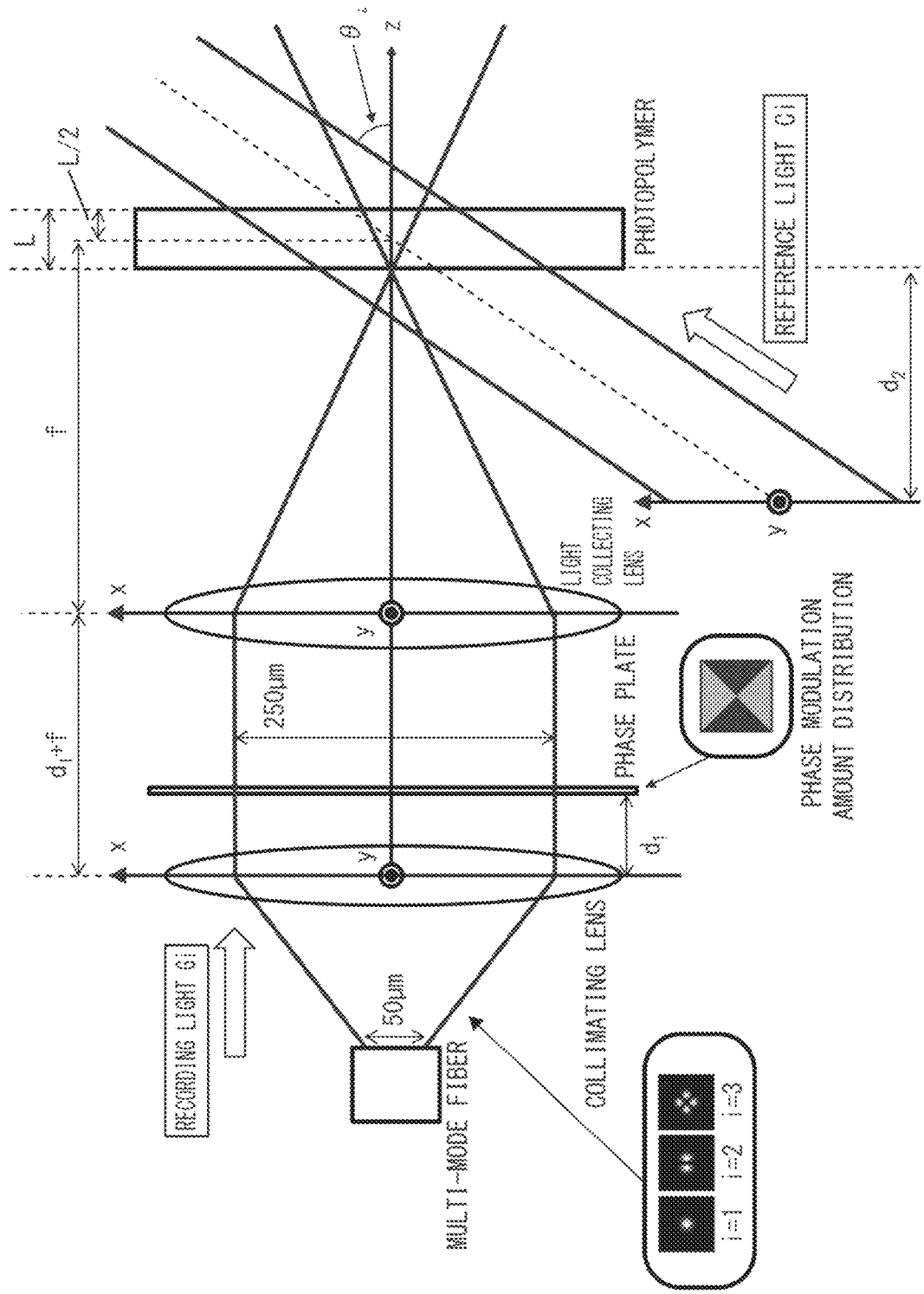
FIG. 7 is a view illustrating a numerical analysis model of a process of hologram recording in the optical communication system illustrated in FIG. 6.
Figure 8:
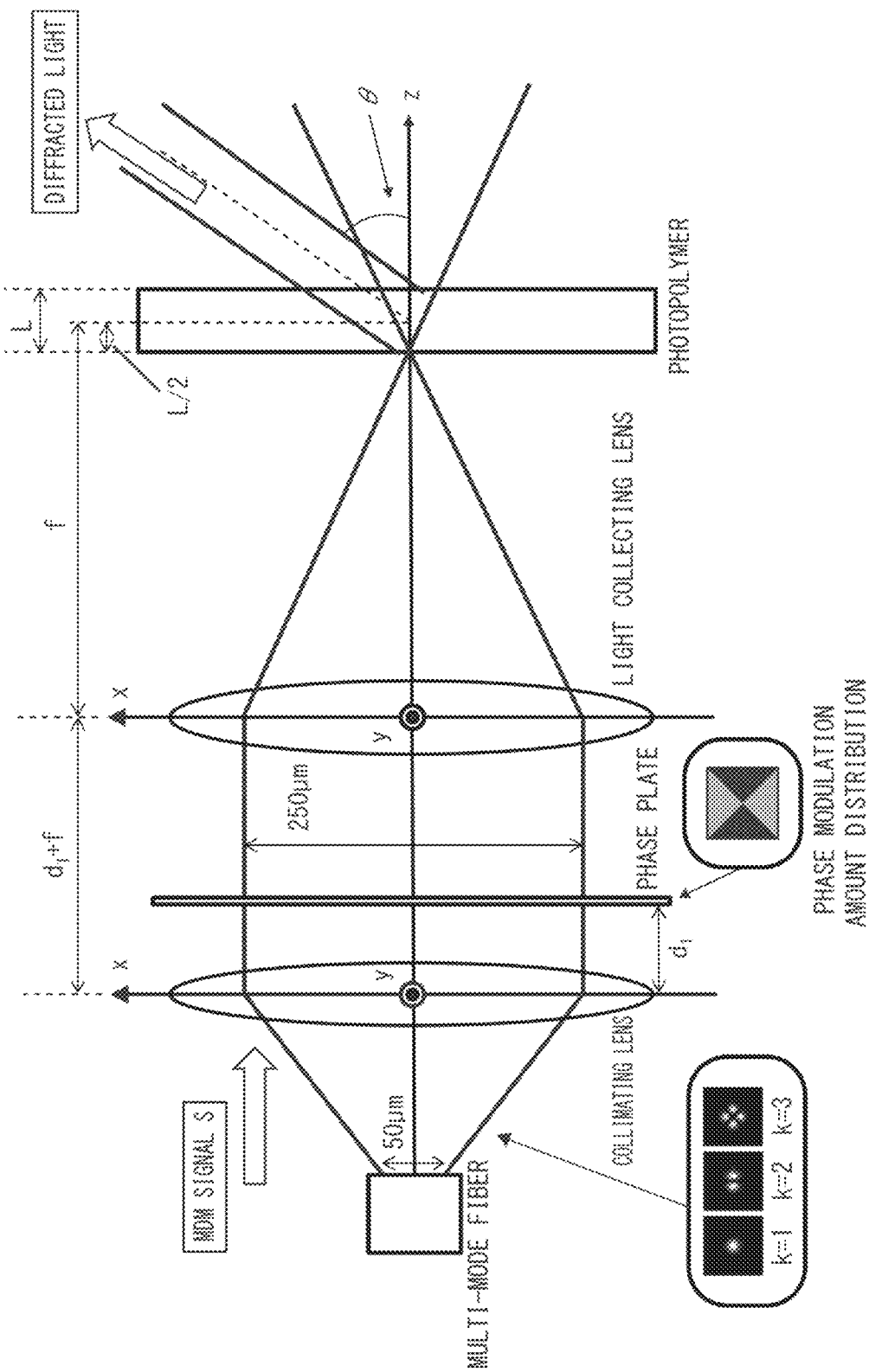
FIG. 8 is a view illustrating a numerical analysis model of a process of hologram reproduction in the optical communication system illustrated in FIG. 6.

FIG. 7 illustrates a numerical analysis model of a process of hologram recording. FIG. 8 illustrates a numerical analysis model of a process of hologram reproduction. Note that recording light Gi used has a wavelength of 532 nm, an angle θ of reference light Ci used in hologram recording is set to 6°, 8°, and 10°, and an intensity ratio of the recording light Gi to the reference light Ci is 1:100. A collimating lens (for making light waves emitted from the multi-mode fiber (MMF) parallel light) has a focal length dl of 10 μm, a light collecting lens provided in front of a hologram medium has a focal length f of 1.5 mm, and the hologram medium has a thickness L of 150 μm. As illustrated in FIGS. 7 and 8, in the process of hologram recording or the process of hologram reproduction, signal light is converted by the phase plate and then enters the hologram medium.

Firstly, with use of the group A which is a combination of the spatial modes $LP_{01}$, $LP_{11}$, and $LP_{21}$ and the group B which is a combination of the spatial modes $LP_{01}$, $LP_{11a}$, and $LP_{11b}$, it is confirmed that the modes in each combination are converted by the phase plate so as to have respective distributions having a small spatial overlap therebetween.

Figure 9:
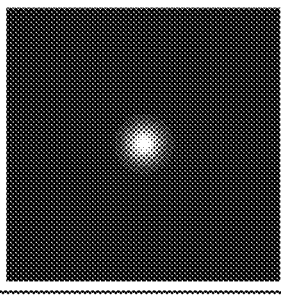
FIG. 9 is a view illustrating an example of intensity distributions of signal light before and after phase modulation in the optical communication system illustrated in FIG. 6.
Figure 10:
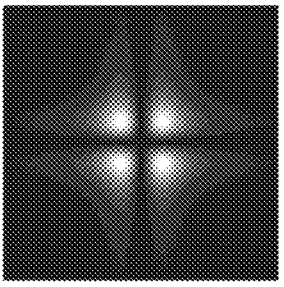
FIG. 10 is a view illustrating another example of intensity distributions of signal light before and after phase modulation in the optical communication system illustrated in FIG. 6.
Figure 10:
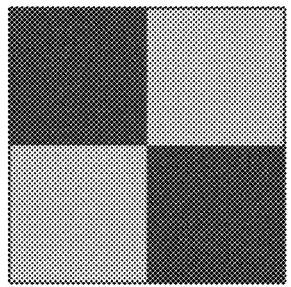
Figure 10:
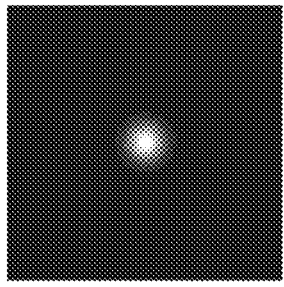
Figure 10:
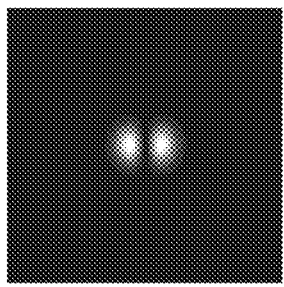
Figure 10:
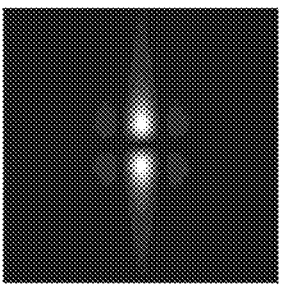
Figure 10:
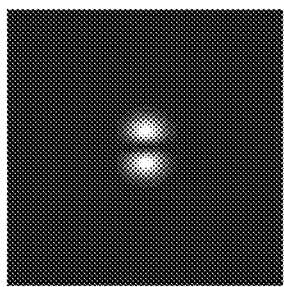
Figure 10:
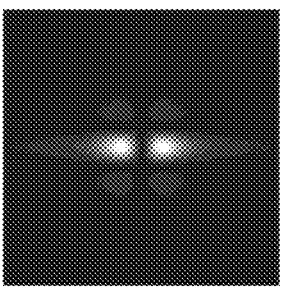

FIG. 9 shows intensity distributions of the group A before and after phase modulation. FIG. 10 shows intensity distributions of the group B before and after phase modulation. Specifically, the group A was subjected to modulation with use of a phase plate having a phase modulation amount distribution of $LP_{21a}$, and the group B was subjected to modulation with use of a phase plate having a phase modulation amount distribution of $LP_{21b}$.

It is known from results shown in FIG. 9 that in the group A, due to an effect of the phase plate provided, $LP_{01}$ is converted into $LP_{21a}$, $LP_{21}$ is converted into $LP_{01}$, and $LP_{11}$ is converted into another intensity distribution that does not overlap with these intensity peaks. Thus, a reduction in spatial overlap between the three modes is confirmed.

It is known from results shown in FIG. 10 that also in the group B, due to an effect of the phase plate provided, $LP_{01}$ is converted into $LP_{21b}$, $LP_{11a}$ is converted into $LP_{11b}$, and $LP_{11b}$ is converted into $LP_{11a}$. Thus, a result similar to that of the group A is confirmed.

Next, with use of these phase modulation amount distributions after the conversions, hologram recording and mode demultiplexing (hologram reproduction) are carried out to confirm an improvement in mode multiplexing efficiency.

Figure 11:
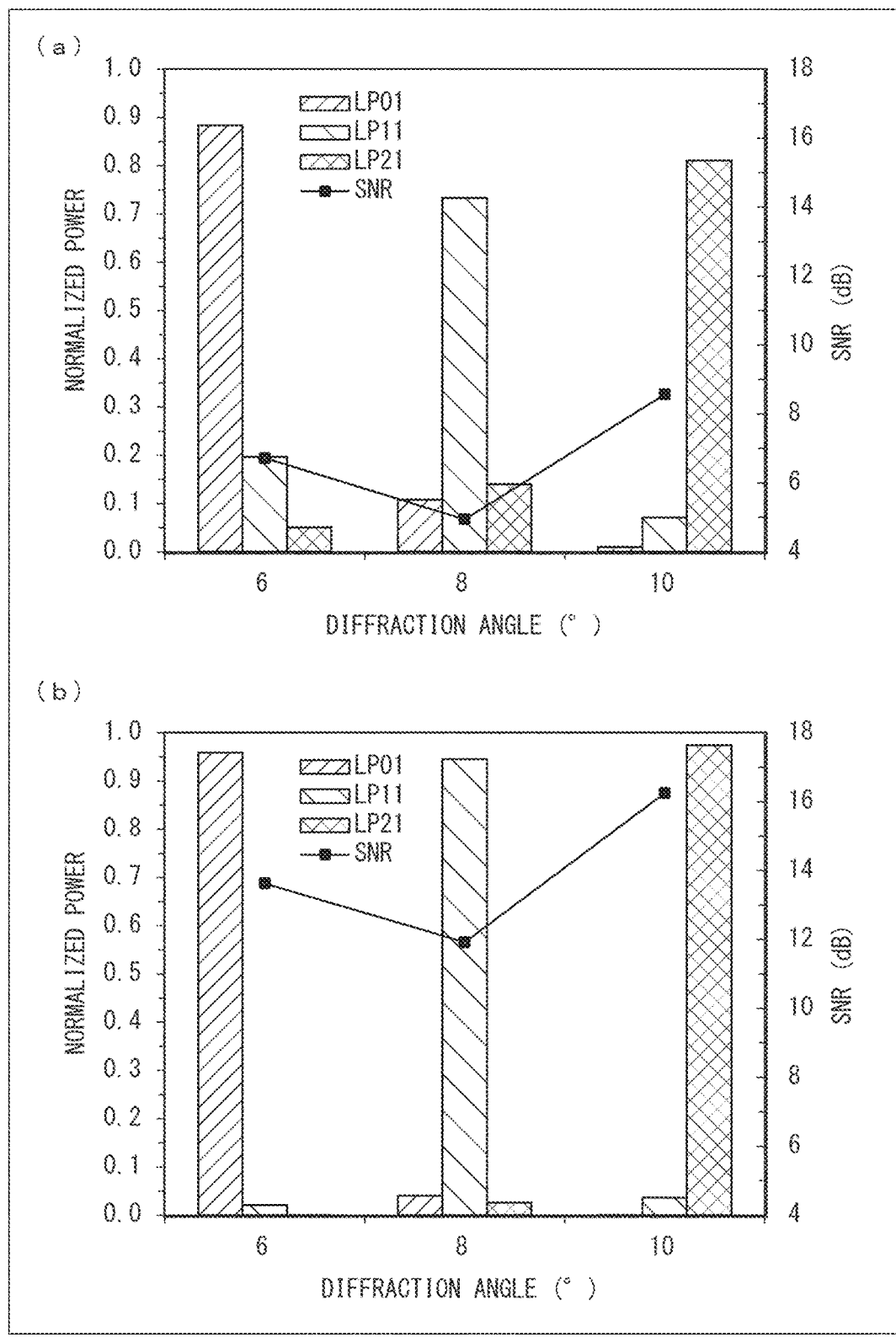
FIG. 11 is graphs each showing a relation between a diffraction angle and normalized power with respect to each spatial mode shown in FIG. 9. (a) shows a case in which phase modulation by a phase plate is not performed. (b) shows a case in which phase modulation by a phase plate having a phase modulation amount distribution shown in FIG. 9 is performed.

(a) and (b) of FIG. 11 each show a relation between each diffraction angle and normalized power and a relation between each diffraction angle and SNR in a process of mode multiplexing (process of hologram reproduction) with respect to the group A.

Figure 12:
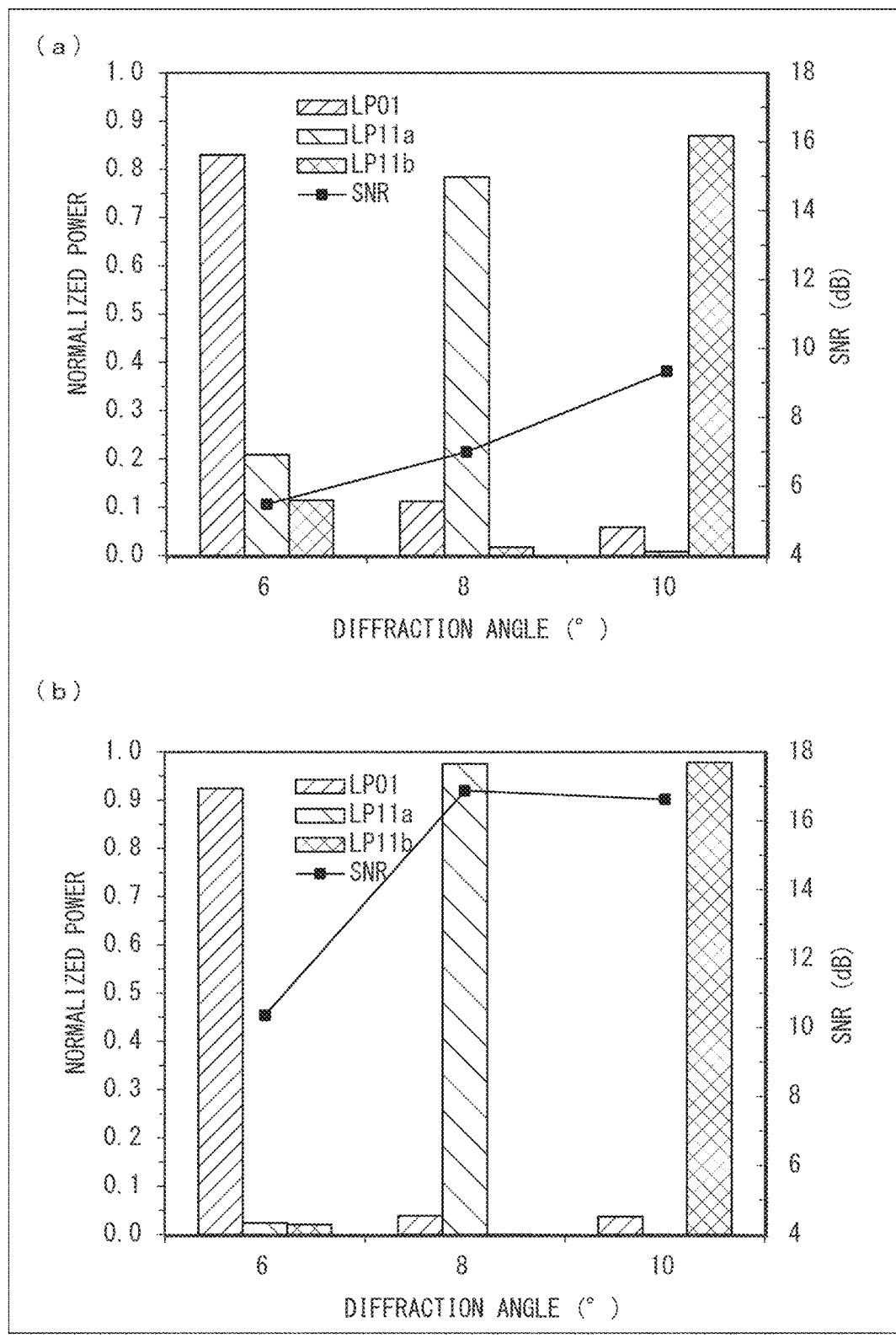
FIG. 12 is graphs each showing a relation between a diffraction angle and normalized power with respect to each spatial mode shown in FIG. 10. (a) shows a case in which phase modulation by a phase plate is not performed. (b) shows a case in which phase modulation by a phase plate having a phase modulation amount distribution shown in FIG. 10 is performed.

(a) and (b) of FIG. 12 each show a relation between each diffraction angle and normalized power and a relation between each diffraction angle and SNR in the process of mode multiplexing (process of hologram reproduction) with respect to the group B.

Note that in each of FIGS. 11 and 12, (a) shows a case in which conversion with use of a phase plate is not performed (a conventional method) and (b) shows a case in which conversion with use of a phase plate is performed (the present invention).

As indicated in FIG. 11, with respect to the group A, a noise component in the present invention is less than a half of that in the conventional method at all diffraction angles, and SNR in the present invention has improved by approximately 7 dB.

As indicated in FIG. 12, with respect to the group B, as with the group A, a noise component in the present invention is less than a half of that in the conventional method, and SNR in the present invention has also improved by 5 dB to 10 dB.

The results above show that the use of a phase plate that is appropriate for a combination of spatial modes allows reducing a spatial overlap between the spatial modes, and accordingly allows improving a demultiplexing characteristic for demultiplexing the spatial modes.

Embodiment 2

The following description will discuss Embodiment 2 of the present invention in detail. For convenience of explanation, the same reference numerals are given to constituent members having functions identical with those in Embodiment 1, and such constituent members will not be repeatedly described in detail.

(Characteristic Portion of Optical Communication System)

Figure 13:
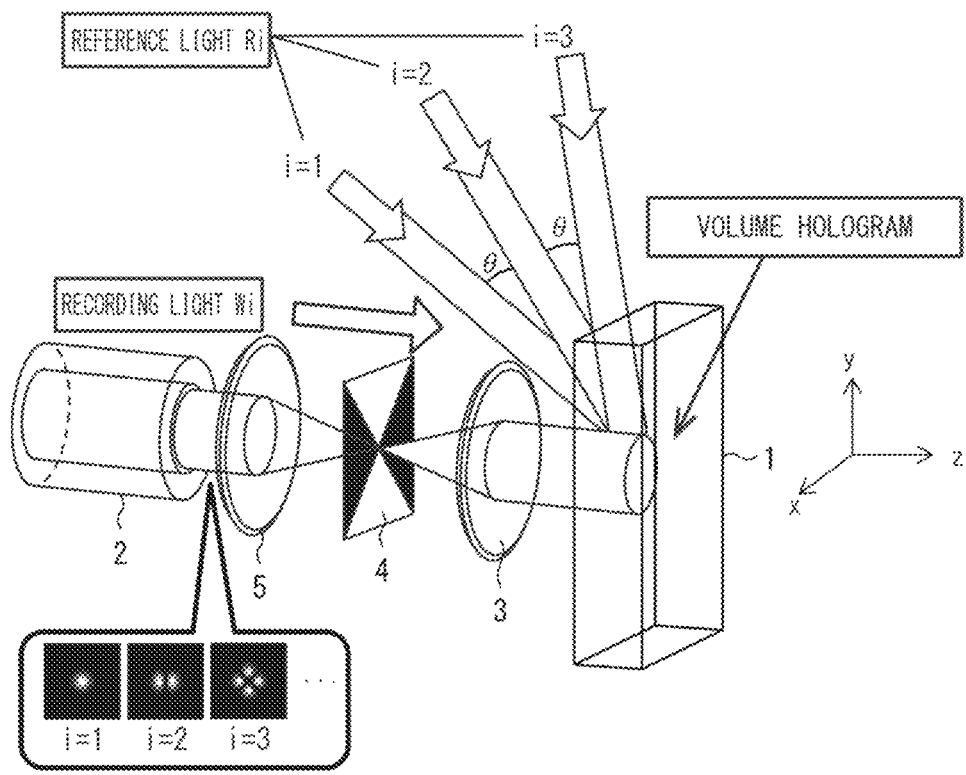
FIG. 13 is a view illustrating a schematic configuration of an optical communication system in accordance with Embodiment 2 of the present invention, the view illustrating an operation of a process of hologram recording in the optical communication system.
Figure 14:
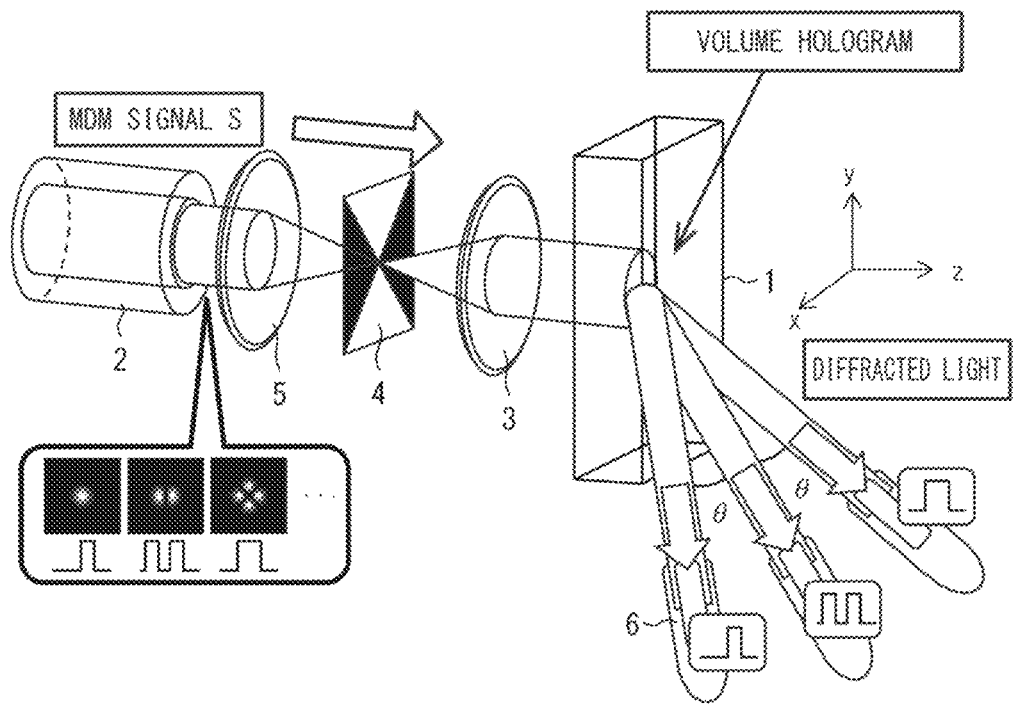
FIG. 14 is a view illustrating an operation of a process of hologram reproduction in the optical communication system illustrated in FIG. 13.

FIGS. 13 and 14 each show a conceptual diagram of an optical communication system in accordance with Embodiment 2. The optical communication system differs from the above-described optical communication system illustrated in FIGS. 1 and 2 of Embodiment 1 in that a light collecting lens 5 is provided between an MMF 2 and a phase plate 4. Accordingly, unlike the optical communication system in accordance with Embodiment 1, the optical communication system in accordance with Embodiment 2 is configured such that each of (i) recording light emitted from the MMF 2 in a process of hologram recording and (ii) an MDM signal emitted from the MMF 2 in a process of hologram reproduction is collected by the light collecting lens 5, enters the phase plate 4 so as to be subjected to phase modulation at the phase plate 4, and then enters the hologram medium 1 through the light collecting lens 3.

With reference to FIGS. 13 and 14, the following description will discuss a process of hologram recording and a process of hologram reproduction separately. Note that detailed operation principles of hologram recording and hologram reproduction are similar to those of the optical communication system illustrated in FIGS. 3 and 4 in Embodiment 1, and will not be repeatedly described in detail.

(Hologram Recording Process: Hologram Recording Step)

FIG. 13 is a view illustrating a process of hologram recording in the optical communication system in accordance with Embodiment 2.

As illustrated in FIG. 13, first, recording light Wi, which is signal light emitted from the MMF 2, is collected by a collecting lens 5 provided on a path of the recording light Wi, and enters a phase plate 4. The recording light Wi is subjected to spatial phase modulation via an effect of the phase plate 4. The phase plate 4 has a spatial phase modulation amount distribution which is determined in accordance with a combination of spatial modes. Then, the recording light Wi which has been subjected to the phase modulation enters the hologram medium 1 via the light collecting lens 3.

When the recording light Wi enters the hologram medium 1, the recording light Wi which has been converted and reference light Ri which propagates at a different angle interfere with each other, so that sets of interference fringes, the number of which sets is equal to the number of the spatial modes, are recorded in the hologram medium 1. At this time, an incident angle θ of the reference light Ri is changed for each of the spatial modes, so that angle multiplex-recording is made. Thus, a volume hologram corresponding to the recording light Wi is recorded in the hologram medium 1.

(Process of Hologram Reproduction)

FIG. 14 is a view illustrating a process of hologram reproduction in the optical communication system of the present invention.

As shown in FIG. 14, first, an MDM signal S (a combination of spatial modes identical to that in the hologram recording process) emitted from the MMF 2 is collected by the light collecting lens 5 provided on a path of the MDM signal S, enters the phase plate 4, and is converted in a similar manner to the above-described hologram recording process, via the effect of the phase plate 4. This causes the spatial modes to be converted so as to have respective intensity distributions having a small spatial overlap therebetween, in a similar manner to the process of hologram recording.

Then, the MDM signal S which has been converted passes through the collecting lens 3 and enters the volume hologram which has been recorded in the hologram medium 1. This yields diffracted light which is diffracted at an angle θ identical to that of the reference light Ri used in the hologram recording. That is, through the diffraction above, the spatial modes are obtained as diffracted light beams which have been demultiplexed at respective different angles. The diffracted light beams are each inputted to an SMF (single-mode fiber) 6.

Implementation Example

The following description will discuss an aspect of the present invention in actual application.

Figure 15:
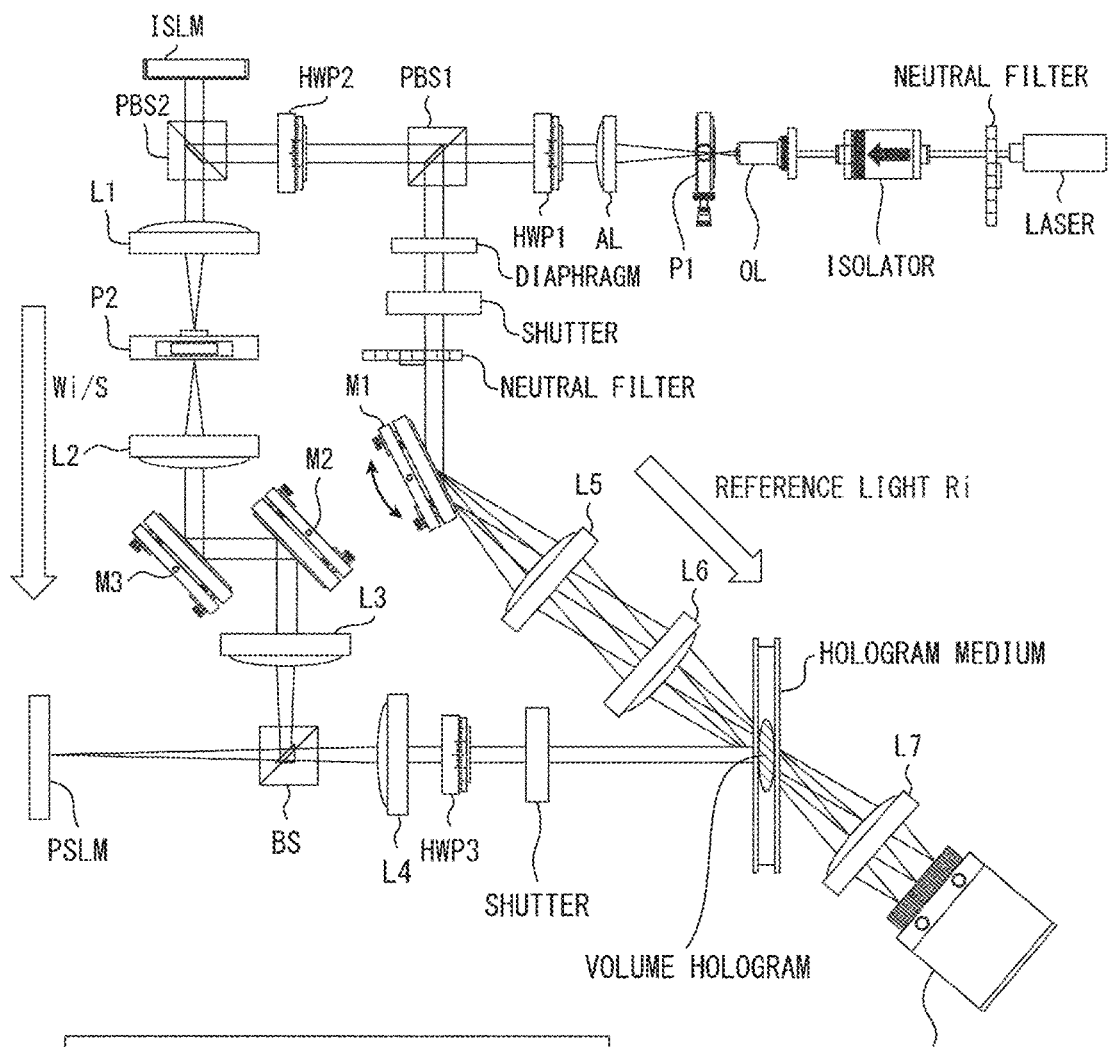
FIG. 15 is a view illustrating another optical system which is used for performing an operation test of an optical communication system of the present invention.

FIG. 15 illustrates an optical system which is used for performing an operation test of the optical communication system. The optical system illustrated in FIG. 15 is configured such that the phase plate 4 illustrated in FIGS. 13 and 14 is provided as a PSLM (phase-type SLM) on a path of signal light (recording light Wi, an MDM signal S) via a beam splitter BS.

First, light emitted from a laser passes through a neutral filter, an isolator, an objective lens OL, a pinhole P1, an achromatizing lens AL, and a half-wave plate HWP1 so as to enter a polarizing beam splitter PBS1. The light is split by the polarizing beam splitter PBS1 into rectilinear light and reflected light.

Then, in a process of hologram recording, the rectilinear light is modulated by a spatial light modulator into the recording light Wi having a distribution of spatial modes. The recording light Wi is modulated by the PSLM (phase-type SLM) so as to have intensity distributions having a small spatial overlap therebetween, and then enters a hologram medium. Meanwhile, the reflected light enters the hologram medium as reference light Ri, at an angle different from that of the recording light Wi. At this time, interference fringes between the recording light Wi and the reference light Ri are recorded in the hologram medium. This recording is carried out the same number of times as the number of spatial modes, while an incident angle of the reference light Ri with respect to the spatial modes is changed. This causes a volume hologram to be recorded in the hologram medium.

Subsequently, in a process of hologram reproduction (a process of mode demultiplexing), only the signal light (the MDM signal S) enters the hologram medium. The signal light is modulated by the spatial light modulator so as to have a distribution of spatial modes. Then, the signal light thus modulated is modulated and similarly converted with use of the PSLM (phase-type SLM) used in the process of recording. The signal light thus converted enters the hologram medium in which the interference fringes (the volume hologram) have been recorded. Thus, the signal light obtains diffracted light which is diffracted at an angle at which the reference light Ri entered the hologram medium in the process of hologram recording. In this case, since a diffraction angle differs for each of the spatial modes, demultiplexing of the spatial modes can be achieved.

(Effect)

In the optical system of the present invention, a spatial distribution of signal light (a plurality of spatial modes whose orders are low and close to each other) is converted by a PSLM (phase-type SLM) which is provided additionally as described above. The PSLM (phase-type SLM) is selected in accordance with a combination of the spatial modes. Accordingly, the spatial modes have respective intensity distributions having a small spatial overlap therebetween. This enables an improvement in mode demultiplexing characteristic for demultiplexing the spatial modes in the hologram medium. Consequently, the mode demultiplexing characteristic can be improved by 5 dB to 10 dB in terms of decibel. An effect of the present technique is exhibited more in a case of demultiplexing a combination of spatial modes having a significant overlap therebetween. Accordingly, the present technique is suitable for demultiplexing of a combination of spatial modes whose orders are close to each other.

The present invention is suitable for the MDM, in which compensation of a crosstalk is carried out by signal processing and, accordingly, modes whose orders are close to each other are typically used. Thus, the present invention is extremely effective when used in the MDM, and makes a great contribution to improving technology in next-generation optical communications.

The present invention is not limited to the above-described embodiments but allows various modifications within the scope of the claims. Any embodiment derived from an appropriate combination of the technical means disclosed in the different embodiments will also be included in the technical scope of the present invention.

Note that, as with Embodiment 1, the descriptions above have dealt with an example in which a photorefractive medium is used as the hologram medium 1 illustrated in FIGS. 13 and 14. That is, in the descriptions above, rewriting of a hologram is realized by use of the photorefractive medium as the hologram medium 1. Note, however, that in a case where rewriting of a hologram is not performed, a general hologram medium without a photorefractive property, such as a photopolymer, can also enable operations. However, many media other than the photorefractive medium do not allow a hologram to be rewritten after formation of the hologram. As such, the media other than the photorefractive medium has a disadvantage that, unlike the photorefractive medium, the media do not allow signal demultiplexing to be maintained and continued by rewriting a hologram in a case where temporal fluctuations and distortions occur in modes transmitted through an optical fiber. Thus, it is more advantageous to use the photorefractive medium.

Example 2

The following description will discuss Example 2 of the present invention, with reference to the optical system illustrated in FIG. 15 and results shown in FIGS. 16 through 21. In Example 2, the results shown in FIGS. 16 through 21 are obtained under the following conditions with use of a spatial mode group constituted by spatial modes $LP_{01}$, $LP_{11}$, and $LP_{21}$. In Example 2, a phase plate is characterized by being in phase conjunction with the spatial mode $LP_{21}$, in order to reduce an overlap between intensities of the respective spatial modes.

In the optical system illustrated in FIG. 15, a photopolymer with a thickness of 400 μm is used as a hologram medium, and a laser with a wavelength of 532 nm, which is within a range detectable by the photopolymer, is used as a light source. The spatial modes are generated by an ISLM (intensity-type spatial light modulator (e.g., LC-R 1080 manufactured by SANTEC CORPORATION, etc.)). A PSLM (phase-type spatial light modulator (e.g., SLM-100-01-0002-01 manufactured by HOLOEYE, etc.)) is used as the phase plate. An incident angle of reference light Ri is set to 39°, 40°, and 41°.

Figure 16:
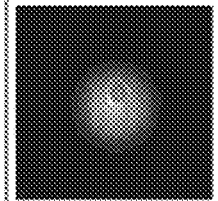
FIG. 16 is a view illustrating an intensity distribution of each spatial mode obtained in the optical system illustrated in FIG. 15.

FIG. 16 is a view illustrating an intensity distribution of each spatial mode obtained in the optical system illustrated in FIG. 15. In FIG. 16, "w/o" indicates an intensity distribution which is actually obtained without phase modulation, "w" indicates an intensity distribution which is actually obtained with phase modulation, and "SIMULATION" indicates an intensity distribution which is obtained through a numerical simulation of an intensity distribution obtained with phase modulation.

Figure 17:
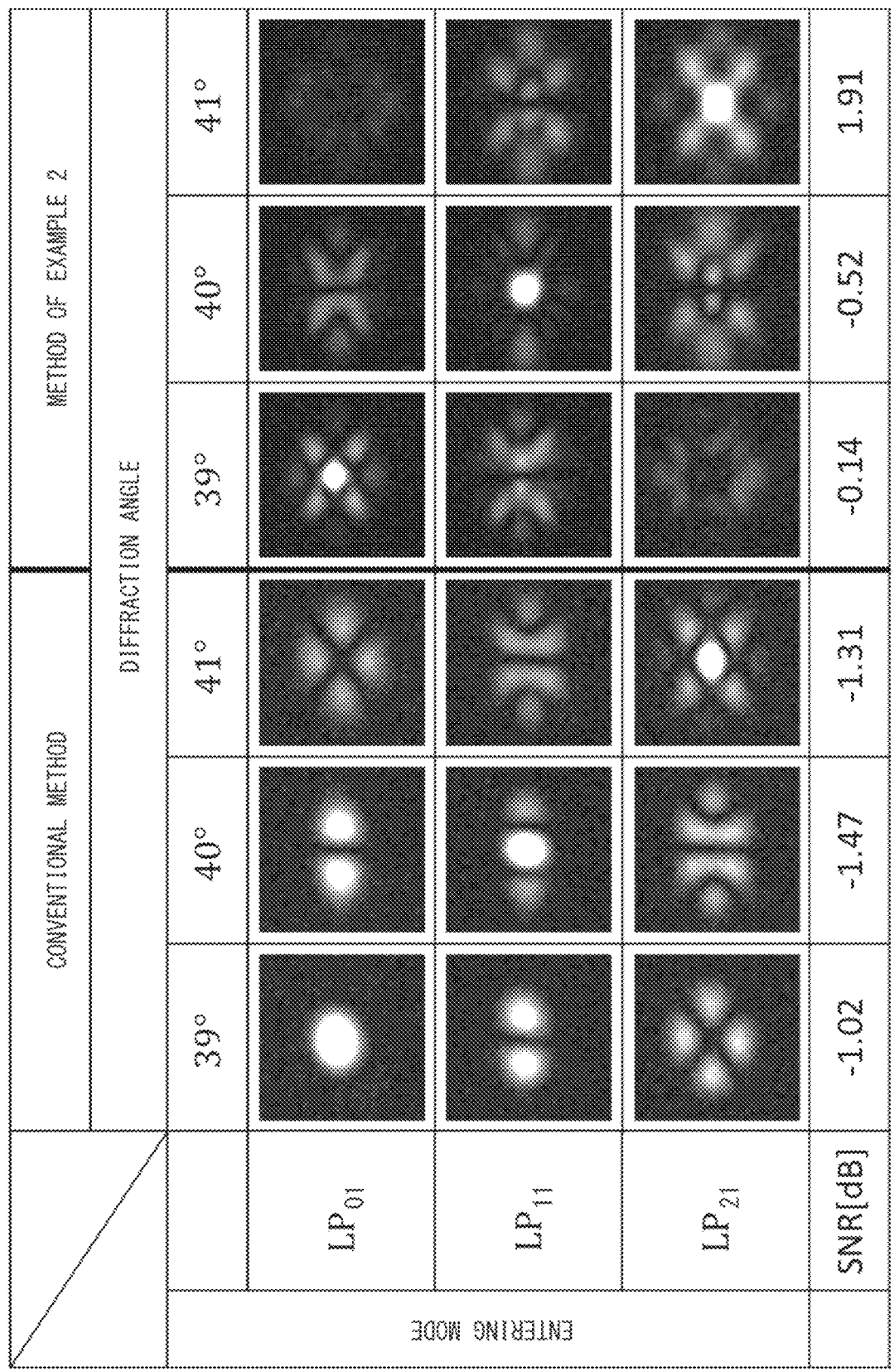
FIG. 17 is a view illustrating diffracted light reconstructed as a result of entering of each spatial mode in the optical system illustrated in FIG. 15.

FIG. 17 is a view illustrating diffracted light reconstructed as a result of entering of each spatial mode in the optical system illustrated in FIG. 15. In FIG. 17, a diffraction angle for each spatial mode is set to 39°, 40°, and 41°, and an intensity distribution of diffracted light in a conventional method and an intensity distribution of diffracted light in the method of Example 2 are shown. The intensity distributions show that a constituent element of each spatial mode is significantly diffracted as a plane wave, at an angle that is in accordance with reference light.

Graphs of FIGS. 18 through 21 each show a result obtained in a case where a virtual optical system of a computer is used so as to cause each diffracted light pass through a virtual pinhole with a diameter of 10 μm.

Figure 18:
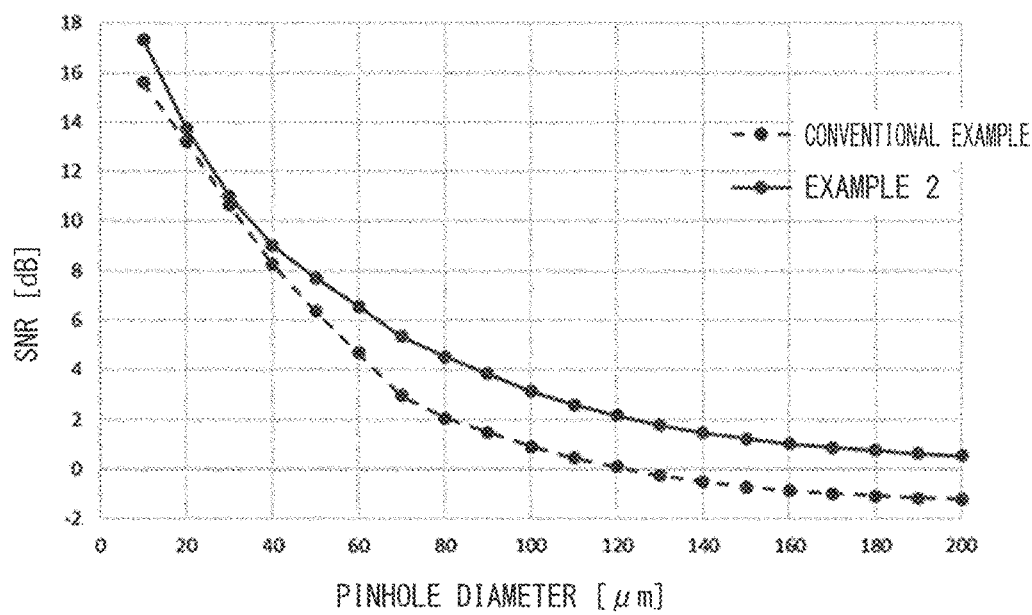
FIG. 18 is a graph showing a relation between a diameter of a pinhole and an average value among spatial modes LP01, LP11, and LP21 in an optical system in each of a conventional method and Example 2.
Figure 19:
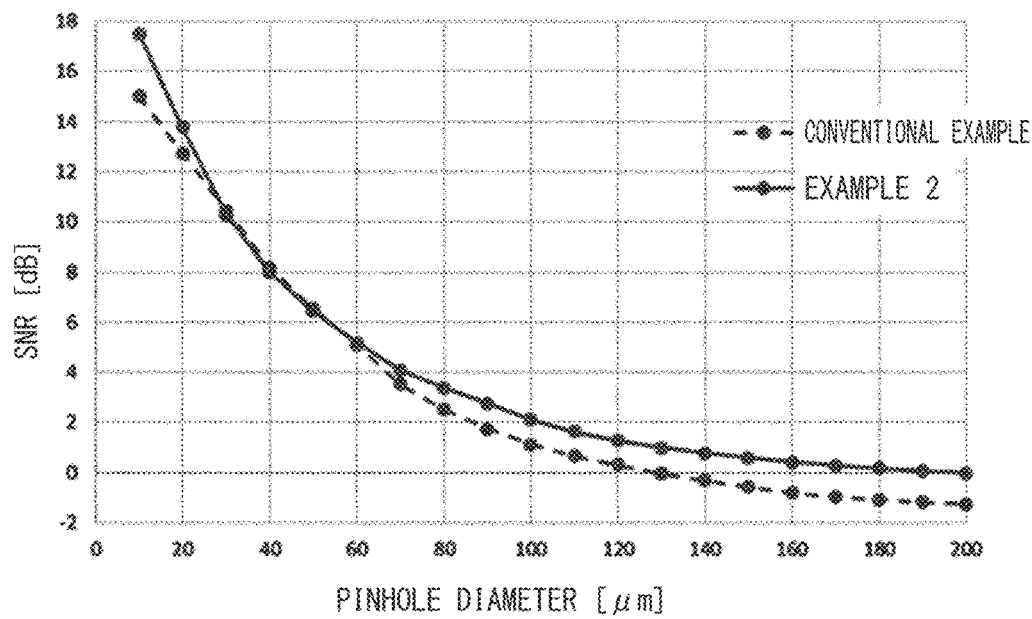
FIG. 19 is a graph showing a relation between a diameter of the pinhole and an SNR of the spatial mode LP01 in the optical system in each of the conventional method and Example 2.
Figure 20:
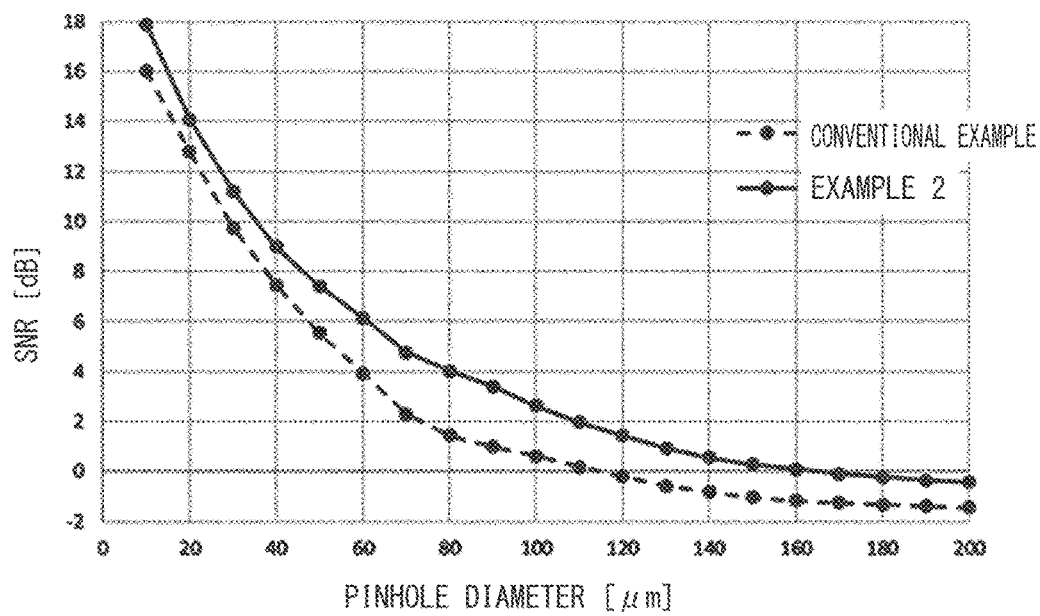
FIG. 20 is a graph showing a relation between a diameter of the pinhole and an SNR of the spatial mode LP11 in the optical system in each of the conventional method and Example 2.
Figure 21:
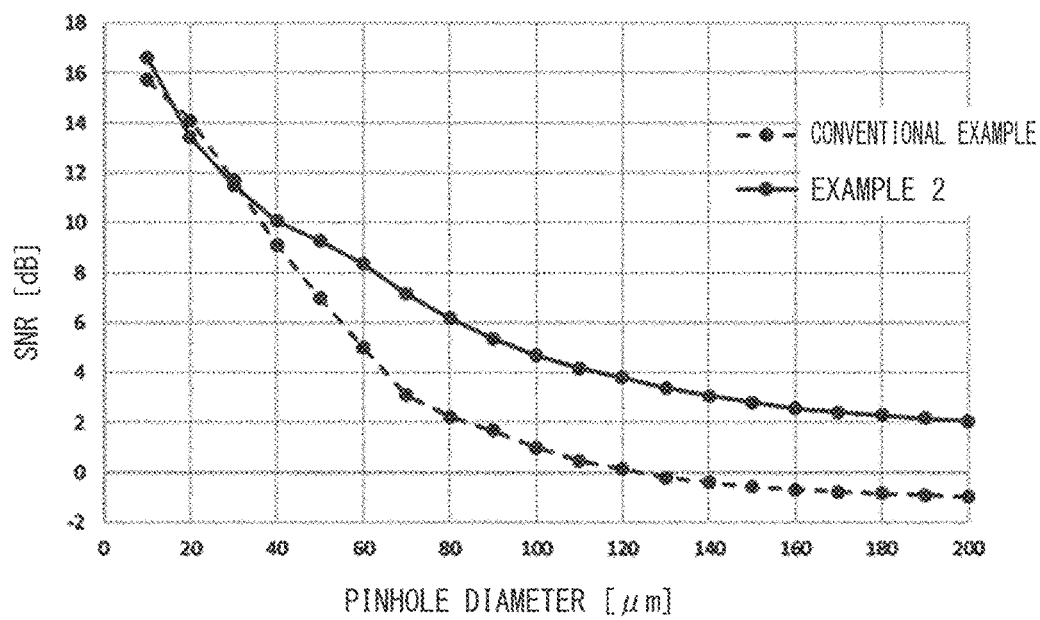
FIG. 21 is a graph showing a relation between a diameter of the pinhole and an SNR of the spatial mode LP21 in the optical system in each of the conventional method and Example 2.

FIGS. 18 through 21 are graphs each showing a relation between a diameter of the pinhole and the SNR in each of the conventional method and Example 2. FIG. 18 is a graph showing an average value among the spatial modes LP01, LP11, and LP21. FIG. 19 is a graph showing a relation between a diameter of the pinhole and an SNR in a case of the spatial mode LP01. FIG. 20 is a graph showing a relation between a diameter of the pinhole and an SNR in a case of the spatial mode LP11. FIG. 21 is a graph showing a relation between a diameter of the pinhole and an SNR in a case of the spatial mode LP21. Form these graphs, it is found that with respect to each spatial mode and with respect to each value of the pinhole diameter, Example 2 tends to have an SNR higher than that of the conventional method.

REFERENCE SIGNS LIST 1 hologram medium (multiplex hologram recording section)
2 MMF (optical fiber)
3 light collecting lens
4 phase plate
5 light collecting lens
6 SMF (optical fiber)

The invention claimed is:

1. An optical communication system performing a communication with use of an optical fiber capable of transmitting signal light containing a plurality of spatial modes, the optical communication system comprising:
   a multiplex hologram recording section in which holograms are multiplex-recorded so as to correspond to the respective plurality of spatial modes of the signal light transmitted by the optical fiber; and
   a phase plate provided on a side of the multiplex hologram recording section on which side the signal light enters the multiplex hologram recording section, the phase plate modulating phases of the respective plurality of spatial modes of the signal light so as to reduce a spatial overlap between the plurality of spatial modes,
   wherein a phase modulation amount distribution of the phase plate is set in accordance with the plurality of spatial modes of the signal light which passes through the phase plate.

2. The optical communication system as set forth in claim 1, wherein the phase modulation amount distribution of the phase plate is set such that in the signal light which passes through the phase plate, the spatial overlap between the plurality of spatial modes after the signal light passes through the phase plate is smaller than that before the signal light passes through the phase plate.

3. An optical communication method performing a communication with use of an optical fiber capable of transmitting signal light containing a plurality of spatial modes, the method comprising:
   a recording step of (i) modulating, with use of a phase plate, phases of the respective plurality of spatial modes of the signal light transmitted by the optical fiber and (ii) multiplex-recording the phases, which have been modulated, in a multiplex hologram recording section,
   the phase plate modulating the phases of the respective plurality of spatial modes so as to reduce a spatial overlap between the plurality of spatial modes,
   wherein a phase modulation amount distribution of the phase plate is set in accordance with the plurality of spatial modes of the signal light which passes through the phase plate.

4. The optical communication method as set forth in claim 3, wherein the phase modulation amount distribution of the phase plate is set such that in the signal light which passes through the phase plate, the spatial overlap between the plurality of spatial modes after the signal light passes through the phase plate is smaller than that before the signal light passes through the phase plate.

* * * * *